United States Patent
Mizuno et al.

(10) Patent No.: US 7,239,444 B2
(45) Date of Patent: Jul. 3, 2007

(54) DISPLAY FRONT PLANE, DISPLAY LENTICULAR LENS, AND DISPLAY FRESNEL LENS

(75) Inventors: Wataru Mizuno, Hino (JP); Atsushi Saito, Tachikawa (JP); Ichiro Kudo, Mitaka (JP)

(73) Assignee: Konica Minolta Holdings, Inc., Tokyo (JP)

(*) Notice: Subject to any disclaimer, the term of this patent is extended or adjusted under 35 U.S.C. 154(b) by 279 days.

(21) Appl. No.: 10/945,761

(22) Filed: Sep. 21, 2004

(65) Prior Publication Data

US 2005/0068617 A1 Mar. 31, 2005

(30) Foreign Application Priority Data

Sep. 29, 2003 (JP) .............................. 2003-338627
Sep. 29, 2003 (JP) .............................. 2003-338636
Sep. 30, 2003 (JP) .............................. 2003-341971

(51) Int. Cl.
*G03B 21/56* (2006.01)
*G03B 21/60* (2006.01)
*G02B 1/10* (2006.01)
*G02B 27/00* (2006.01)
*B05D 3/04* (2006.01)
*H05C 1/00* (2006.01)
*C23C 16/00* (2006.01)

(52) U.S. Cl. ...................... 359/443; 359/457; 359/580; 359/601; 359/619; 427/458; 427/472; 427/255.26; 427/255.28; 427/255.6; 427/255.7; 427/348

(58) Field of Classification Search ................ 359/443, 359/457, 580, 601, 619; 427/495, 458, 472, 427/255.23, 255.26, 255.28, 255.6, 255.7, 427/348
See application file for complete search history.

(56) References Cited

U.S. PATENT DOCUMENTS 3,668,233 A 6/1972 Pavlik (Continued)

FOREIGN PATENT DOCUMENTS

JP 50-123448 9/1975

(Continued)

OTHER PUBLICATIONS

Inomata et al., "Synthesis of Silane Coupling Agents Containing a Fluorocarbon Chain Using Telomerization of Trichlorovinylsilane", Zairyou Gijutsu, vol. 16, No. 5 (1998) pp. 209-233, English language Abstract.

*Primary Examiner*—W. B. Perkey
*Assistant Examiner*—Magda Cruz
(74) *Attorney, Agent, or Firm*—Frishauf, Holtz, Goodman & Chick, P.C.

(57) ABSTRACT

A display front plane having an anti-reflection film in thickness uniformity and good adhesion between the anti-reflection film and the base material is supplied. Each of a display lenticular lens and a display fresnel lens having a sophisticated anti-reflection function with a high total light transmittance is also to be provided. As for the display front plane, lenticular lens, fresnel lens relating to the present invention, gas containing a gas for thin film formation is introduced into a discharge space under the atmospheric pressure or the pressure close to it and the gas is activated by applying a high frequency electric field in the discharge space mentioned above. And then, anti-reflection film at least on one side of the surface of the base material is formed by exposing the base material in the aforementioned activated gas.

16 Claims, 7 Drawing Sheets

U.S. PATENT DOCUMENTS

| | | | |
|---|---|---|---|
| 6,759,100 B2 * | 7/2004 | Fukuda et al. | 427/569 |
| 6,822,707 B2 * | 11/2004 | Ariyoshi et al. | 349/112 |
| 2004/0213920 A1 * | 10/2004 | Fukuda et al. | 427/457 |

FOREIGN PATENT DOCUMENTS

| | | | |
|---|---|---|---|
| JP | 58-122979 A | 7/1983 |
| JP | 06-160982 A | 6/1994 |
| JP | 07-242675 A | 9/1995 |
| JP | 08-265675 A | 10/1996 |
| JP | 09-061605 A | 3/1997 |
| JP | 52-143847 A | 11/1997 |
| JP | 11-016696 A | 1/1999 |
| JP | 11-029585 A | 2/1999 |
| JP | 2000-064348 A | 2/2000 |
| JP | 2000-144097 A | 5/2000 |
| JP | 2000-301655 A | 10/2000 |
| JP | 2002-169225 A | 6/2002 |

* cited by examiner

SCREEN STRUCTURE IN A DISPLAY APPARATUS

SCREEN STRUCTURE IN A DISPLAY APPARATUS

DISPLAY FRONT PLANE, DISPLAY LENTICULAR LENS, AND DISPLAY FRESNEL LENS

TECHNICAL FIELD

The present invention relates to the front plane, the lenticular lens, or the fresnel lens and in particular, to the display front plane, the display lenticular lens, or the display fresnel lens in front of a display apparatus on which an anti-reflection film is prepared.

BACKGROUND

Various displays such as liquid crystal display, projection display and plasma display have recently been developed and put into practical use. Those displays have been utilized as apparatus for displaying an image such as PC, TV, and car navigation system as usage.

Materials protecting against reflection are usually placed on the surface of display apparatuses. For example, in the case of liquid crystal display, a protection film is attached on the surface of the display in order to avoid reflection of outside light at the surface. The protection film is thin enough, so that it possesses a superior optical transparency and the liquid crystal display can display an image in the state of minimizing the loss of back light intensity even though a protection film is placed on the surface.

In contrast to the foregoing, as for a projection display apparatus displaying an image by a projection of an image light incident from the back of a transmission type screen, an anti-reflection film is prepared on a surface of a transparent panel called front plane designed for the protection of a transmission type screen and achievement of a glossy picture quality. (Refer to Patent Document: TOKKAIHEI No. 8-265675).

An ordinary transmission type screen has a positional structure for which one screen of a lenticular lens is put on top of another screen of a fresnel lens (Refer to Patent Document: TOKKAIHEI No. 6-160982). Light diffusion fine particles composed of glass and polymeric material are mixed into the base material of the lenticular lens, and each of both surfaces of the lenticular lens is in a cylindrical shape. Striped and protrusion-shaped outside light absorption layers (Black stripes) at non-light-converging areas on the side where light enters among two surfaces of the lenticular lens are formed at a given pitch, thus, a lenticular lens is designed to prevent a decline of contrast influenced by outside light.

Incidentally, in the aforementioned lenticular lens, a part of light diffusion fine particles is generally protruded from surfaces of the cylinder-shaped region and the black stripe region. In such a structure, there is a problem presented with a decline of contrast and a whitish surface of screen caused by occurrence of irregular reflection of outside light on the surface of light emergence when irregularities are present on the surface of lenticular lens and outside light is projected on the surface of the outgoing light of lenticular lens.

Though there is a method by which a transparent panel made of glass or plastics with a lower light transmittance is placed in front of a screen in order to prevent a decline of contrast caused by outside light and a decrease of definition in picture which appears on a screen, there is a problem that a picture on the screen can not be watched easily in this case because of developing extremely images of outside light (lighting fixture, viewers, and so forth) imaged on a transparent panel extremely.

An ordinary transmission type screen has a positional structure for which one screen of a lenticular lens is put on top of another screen of a fresnel lens. When a cross-section of a fresnel lens is seen, the surface of light emergence at a fresnel lens (the surface facing a lenticular lens) has a structure wherein a plurality of fresnel lens surfaces constituting a small portion of circular arc of a concentric circle and a rising surface placed between respective fresnel lenses one after the other are formed alternately and repeatedly. When a picture light is forced to enter a fresnel lens from a projection apparatus situated on the rear side of a transmission screen, the picture light is refracted on the surface of an incidence of a fresnel lens, then, is subsequently refracted on the surface of the fresnel lens again, and emerges from the surface of light emergence in the state where it is converted into a parallel light or a converged light focused on a given point.

In the case of a picture light emerging from the surface of a fresnel lens which is the surface of light emergence, however, there is an occasion when a part of picture light is reflected on the surface of the fresnel lens, then, is trapped within a fresnel lens, and is reflected again on the surface of incidence, to be ejected finally from a rising surface of the surface of light emergence as an unwanted. At this time, ghost images are shown on a screen and also a sharp decline of contrast in picture on the screen appears.

In order to solve such a problem, there is known a technique by which a light diffusion layer or a light absorption layer is provided on rising surfaces which are the surfaces of outgoing light (Refer to Patent Documents 1 and 2). In the case of providing light diffusion layers on rising surfaces, though ghost images become invisible because of total light flux of an unwanted light passing through light diffusion layers substantially with no attenuation, contrast in picture is not particularly improved. On the contrary, in the case of preparing light absorption layers on rising surfaces, though a light absorption agent of 5–10 μm in thickness such as carbon particles, black ink, and so forth has to be coated in order to absorb an unwanted light sufficiently, there is a tendency to reduce a pitch in size (for example, 100 μm) of each surface of the fresnel lens for the fine segmentalization of a picture on a screen in recent years, a picture on a screen becomes dark because of a decline of light transmittance on the surfaces of the fresnel lens in order that the surface of the fresnel lens may be interrupted by an amount equivalent to thickness of the light absorption agent for a fresnel lens which formed the surfaces of the fresnel lens with a very fine pitch.

In such a situation, it is prevented that a picture light is reflected on the surface of a fresnel lens and emerges from rising surfaces as an unwanted light by preparing an anti-reflection film on the surface of a fresnel lens with a coating technique in the techniques described in Patent Document 3 to improve the light transmittance on the surface of a fresnel lens.

[Patent Document 1] TOKKAISHO No. 50-123448
[Patent Document 2] TOKKAISHO No. 52-143847
[Patent Document 3] TOKKAI No. 2002-169225

SUMMARY

A decline of contrast influenced by reflection of outside light and images of lighting fixture and viewers caught by a display can be reduced by employing the anti-reflection coating technique explained in Patent Document 1. However, light transmittance of a front plane made with the anti-reflection coat is inferior to that of a protection film mentioned above since the base material of the front plane is composed of thicker resin than the protection film, and the anti-reflection coat is required to have higher functions in anti-reflection and uniformity of the coat thickness, compared with the protection film.

There are well-known methods such as a coating technique and an evaporation technique by which anti-reflection coating of a front plane can be prepared. If the anti-reflection film is prepared by a coating technique, thickness uniformity can not be achieved since non-uniformity in the coated anti-reflection film appears. On the other hand, if the anti-reflection film is prepared by an evaporation technique, peeling off an anti-reflection film from the base material can possibly occur since a good adhesion between the anti-reflection film and the base material can not be obtained. An object of the present invention is to provide a display front plane wherein an anti-reflection film in thickness uniformity is obtained and at the same time a good adhesion between the anti-reflection film and the base material is excellent.

In such a situation, though it is possible to prevent a decline of contrast caused by outside light and a decrease of definition in picture which appears on a screen by forming an anti-reflection film prepared on the surface of lenticular lens, a sophisticated anti-reflection function with a high total light transmittance for the anti-reflection film is required in this case. Though a well-known coating technique is given as a technique by which an anti-reflection film is deposited on a lenticular lens, thickness uniformity can not be achieved since non-uniformity in the coated anti-reflection film appears, and an anti-reflection film having a sophisticated anti-reflection function with a high total light transmittance can not be prepared on the surface of lenticular lens if the anti-reflection film is prepared by a coating technique. An object of the present invention is to provide a display lenticular lens having a sophisticated anti-reflection function with a high total light transmittance.

In the case of preparing an anti-reflection film with the coating technique as described in Patent Document 3, however, thickness uniformity can not be achieved since non-uniformity in the coated anti-reflection film appears and an anti-reflection film having a sophisticated anti-reflection function with a high total light transmittance can not be prepared on the surface of fresnel lens.

An object of the present invention is to provide a display fresnel lens wherein a sophisticated anti-reflection function with a high total light transmittance is added.

Note that the second discharge gas and the second gas for thin film formation are not used, but the first discharge gas and the first gas for thin film formation are only used for manufacturing lenticular lens 2 having anti-reflection film 6 and fresnel lens 3 having anti-reflection film 6.

DESCRIPTION OF THE PREFERRED EMBODIMENTS

Figure 1:
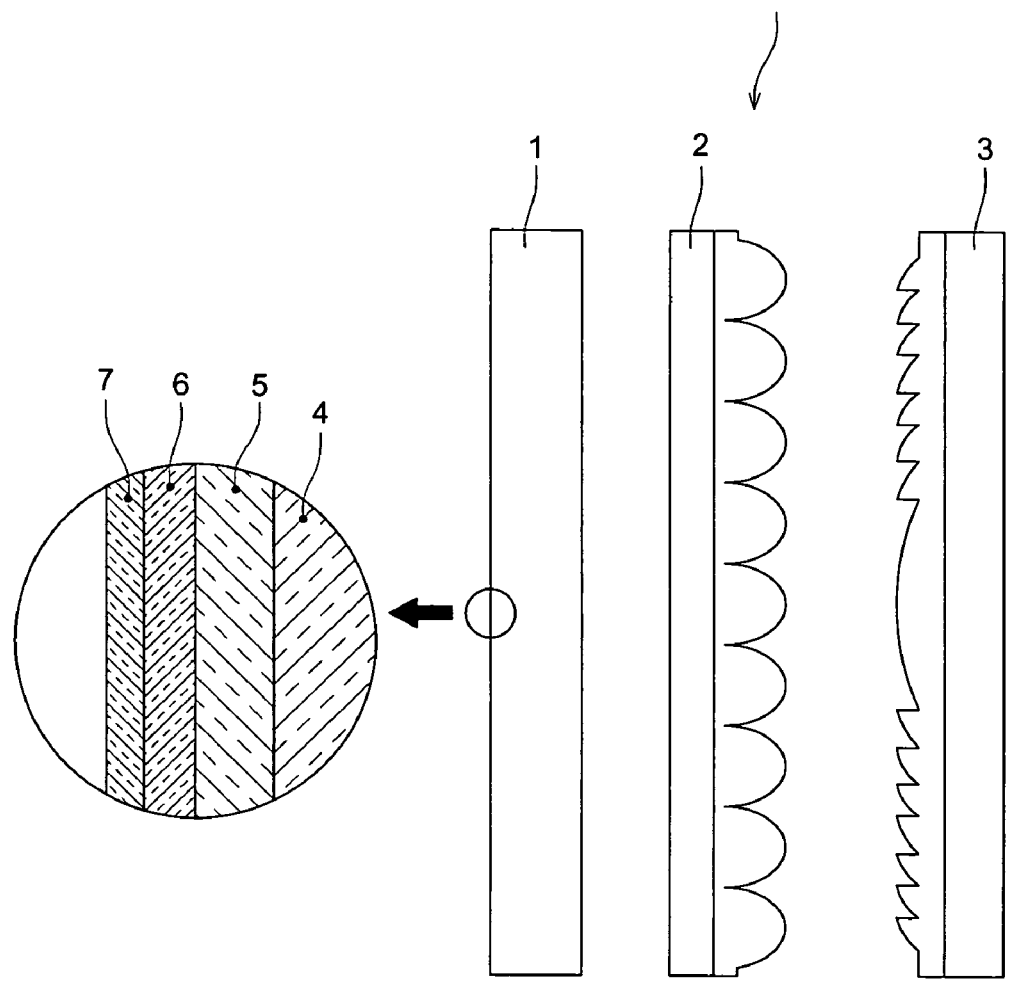
FIG. 1, FIG. 8, and FIG. 9 are cross-section diagrams showing schematically the screen structure of display apparatus.

The present invention is achieved by structures described below.

(Structure 1) A display front plane, a display lenticular lens, or a display fresnel lens on which an anti-reflection film is formed on at least one side of the surface of the aforementioned base material by supplying gas containing the first gas for thin film formation into a discharge space under the atmospheric pressure or the pressure close to it, then, by activating the gas by applying a high frequency electric field to the discharge space, and by exposing the base material to the activated gas, wherein the aforementioned high frequency electric field is the field where the first and the second high frequency electric fields are superposed, frequency of the second high frequency electric field $\omega 2$ is higher than that of the first high frequency electric field $\omega 1$, the relation among intensity of the first high frequency electric field V1, intensity of the second high frequency electric field V2, and electric field intensity at start of discharge IV satisfies V1≧IV>V2 or V1>IV≧V2, and the power density of the second high frequency electric field is 1 W/cm² or more.

(Structure 2) The display front plane, the display lenticular lens, or the display fresnel lens according to Structure 1, wherein the aforementioned discharge space is composed of the first electrode and the second electrode facing each other.

(Structure 3) The display front plane, the display lenticular lens, or the display fresnel lens according to either Structure 1 or Structure 2, wherein the power density of the aforementioned second high frequency electric field is not more than 50 W/cm².

(Structure 4) The display front plane, the display lenticular lens, or the display fresnel lens according to Structure 3, wherein the power density of the aforementioned second high frequency electric field is not more than 20 W/cm².

(Structure 5) The display front plane, the display lenticular lens, or the display fresnel lens according to any one of Structures 1–4, wherein the power density of the aforementioned first high frequency electric field is 1 W/cm² or more.

(Structure 6) The display front plane, the display lenticular lens, or the display fresnel lens according to Structure 5, wherein the power density of the aforementioned first high frequency electric field is not more than 50 W/cm².

(Structure 7) The display front plane, the display lenticular lens, or the display fresnel lens according to any one of Structures 1–6, wherein both of the aforementioned first high frequency electric field and the aforementioned second high frequency electric field are composed of sine waves.

(Structure 8) The display front plane, the display lenticular lens, or the display fresnel lens according to any one of Structures 2–7, wherein the aforementioned first and second high frequency electric fields are applied to the first and second electrodes respectively.

(Structure 9) The display front plane, the display lenticular lens, or the display fresnel lens according to any one of Structures 1–8, wherein an amount of 90–99.9 vol % of the total gas introduced into the aforementioned discharge space is the first discharge gas.

(Structure 10) The display front plane, the display lenticular lens, or the display fresnel lens according to Structure 9, wherein the aforementioned first discharge gas contains 50–100 vol % of nitrogen gas.

(Structure 11) The display front plane, the display lenticular lens, or the display fresnel lens according to either Structure 9 or Structure 10, wherein the aforementioned first discharge gas contains inert gas whose volume is less than 50 vol %.

(Structure 12) The display front plane, the display lenticular lens, or the display fresnel lens according to any one of Structures 1–11, wherein the aforementioned first gas for thin film formation contains at least one selected from those such as an organometallic compound, a halogenated metal, and a metallic hydrogen compound.

(Structure 13) The display front plane, the display lenticular lens, or the display fresnel lens according to Structure 12, wherein the aforementioned organometallic compound contains at least one selected from those such as an organosilicon compound, an organotitanium compound, an organotin compound, an organozinc compound, an organoindium compound, and an organoaluminum compound.

(Structure 14) The display front plane, the display lenticular lens, or the display fresnel lens according to any one of Structures 1–13, wherein a thickness of the aforementioned base material is 1 mm or more.

(Structure 15) The display front plane according to any one of Structures 1–14, wherein an antifouling film containing an organometallic compound having an organic group with fluorine atoms is formed on the aforementioned anti-reflection film.

(Structure 16) The display front plane according to Structure 15, wherein under the atmospheric pressure or the pressure close to it, the second discharge gas is introduced into the discharge space to be activated, then, the activated second discharge gas is brought into contact with the second gas for thin film formation containing an organometallic compound having an organic group with fluorine atoms outside the discharge space to generate indirect activated gas, thus an antifouling film is prepared onto the aforementioned anti-reflection film on the aforementioned base material by exposing the base material to the indirect activated gas.

DETAILED DESCRIPTION OF INVENTION

In the invention described in structure 1, the plasma discharge treatment takes place under the atmospheric pressure or the pressure close to it, which is meant to be 20 to 110 kPa. A pressure between 93 and 104 kPa is preferable to achieve a good result described in the invention of structure 1.

As for the present invention, gas introduced into a space for discharge between electrodes facing each other contains the first discharge gas activated by the electric field and the first gas for thin film formation to prepare a thin film in an activated state of plasma generated with receiving the energy of the first discharge gas.

As for the present invention, however, a production cost for thin film formation associated with use of the first discharge gases, which are inert gases such as helium and argon, depends largely on the cost of the first discharge gas. The present inventors have also intensively investigated the first discharge gases as an alternative in an environmentally consciousness and it is found that the first discharge gases as alternatives can be air, oxygen, nitrogen, carbon dioxide, and hydrogen. It is also found that properties such as superior thin film formation, thickness uniformity, and good adhesion with strength can be obtained by finding the condition of a high density plasma generation in use of those discharge gases, so that the above results led to the present invention.

As for the discharge condition in the present invention, the aforementioned high frequency electric field is the field which is superposed by the first and the second high frequency electric field. It is characterized that frequency $\omega_2$ (the second one) is higher than frequency $\omega_1$ (the first one), the relation among $V_1$ (intensity of the first one), $V_2$ (intensity of the second one), and IV (the electric field intensity at start of discharge) meets $V_1 \geq IV > V_2$ or $V_1 > IV \geq V_2$, and the power density of the second high frequency electric field, mentioned before, is 1 $W/cm^2$ or more.

The High frequency is meant to be a frequency having at least 0.5 kHz. If superposed high frequency electric fields are both composed of sine waves, the resultant component becomes a component superposed by $\omega_1$ of the first high frequency electric field and $\omega_2$ of the second high frequency electric field which is higher frequency than $\omega_1$. The wave form led by $\omega_2$ superposed on $\omega_1$ becomes a sawtooth wave form.

An electric field intensity at starting point of discharge indicates a minimum electric field intensity by which a discharge can be generated with a discharge space used for a feasible method for thin film preparation (including the structure of electrodes) and also the condition of reactions (including the condition of gases). In the case of the same discharge space, the electric field intensity at starting point of discharge is subject to an electric field intensity at starting point of discharge for the first discharge gas though it undergoes slight changes with kinds of gas introduced into a discharge space, kinds of dielectric substance on electrodes, and a distance between electrodes.

After occurrence of discharge at a possible point suitable for thin film preparation, a high density plasma necessary to thin film formation in high quality is presumably generated by applying a high frequency electric field in the discharge space as mentioned above.

What is important here is that such a high frequency electric field is applied in the same discharge space between electrodes facing each other. Thin film formation in the present invention can not be obtained if two electrodes are placed side by side and different high frequency electric fields are applied in the remote, different discharge spaces respectively as shown in TOKKAIHEI No. 11-16696.

Superposition of continuous waves such as sine waves has be explained, to which, however, the invention is not limited. It is however accepted that both waves can be not only pulse waves but combined waves of a continuous wave and a pulse wave. It is also accepted that there is the third electric field applied in this system.

The practical method by which the above high frequency electric field is applied in the same discharge space in the invention described above is to use an atmospheric pressure plasma discharge treatment equipment in which the first power source, by which the first high frequency electric field with $\omega_1$ and $V_1$ is applied, is connected to the first electrode which is composed of electrodes facing each other and the second power source, by which the second high frequency electric field with $\omega_2$ and $V_2$ is applied, is also connected to the second electrode.

A gas supply system for the first discharge gas and the first gas for thin film formation introduced in the discharge space between electrodes facing each other is provided in the above atmospheric pressure plasma discharge treatment equipment. It is also preferable that there should be a electrode temperature control system installed in the atmospheric pressure plasma discharge treatment equipment.

It is preferable that the first filter is connected to the first electrode and the first power source, or either one of the two and the second filter is connected to the second electrode and the second power source, or either one of the two. The first filter is used for an easy current of the first high frequency electric field running through the first electrode from the first power source and for a difficult current of the second high frequency electric field running through the first power source from the second power source by grounding the current of the second high frequency electric field. In the case of the second filter, it works the other way. The second filter is used for an easy current of the second high frequency electric field running through the second electrode from the second power source and for a difficult current of the first high frequency electric field running through the second power source from the first power source by grounding the current of the first high frequency electric field. A difficult current running in this case means current passing through less than 20% and preferably less than 10%. A easy current running on the contrary means current passing through larger than 80% and preferably larger than 90%.

It is preferable that the first power source installed in the atmospheric pressure plasma discharge treatment equipment mentioned in the present invention has a capability of applying a higher frequency electric field higher than the second power source.

High frequency electric field intensity (applied electric field intensity) and electric field intensity at starting point of discharge can be measured by the method mentioned below.

Measurement method of high frequency electric field intensity V1 and V2 (unit: kV/mm):

An electric field intensity is measured by connecting an out-put signal of a high frequency voltage probe into an oscilloscope (Tektronix TDS3012B) after installation of high frequency voltage probes at each electrode.

Measurement method of an electric field intensity at starting point of discharge IV (unit: kV/mm):

It is defined that an electric field intensity at starting point of discharge IV is an electric field intensity at which discharge appears to be started after supplying the first discharge gas in the space between electrodes and increasing an electric field intensity between those electrodes. The measuring-equipments are the same equipments as used in the measurements of high frequency electric field intensity.

Figure 7:
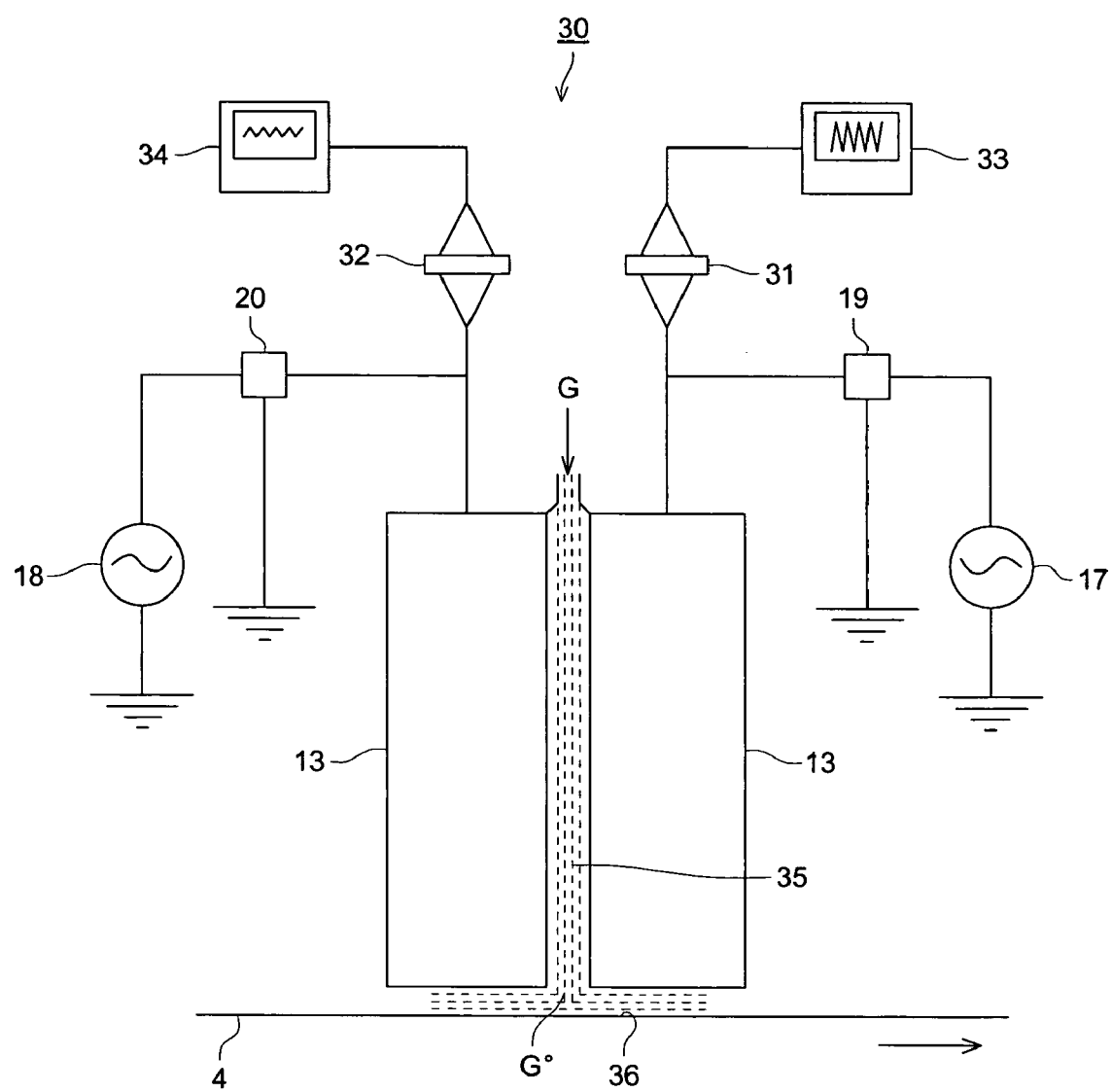
FIG. 7 is a cross-section diagram showing a variation example of an atmospheric pressure plasma discharge treatment equipment in FIG. 2.

In addition, a positioning relationship of a high frequency voltage probe and an oscilloscope used in the above measurements is shown in FIG. 7 described later.

An discharge can occur even though nitrogen gas as the first discharge gas with a high electric field intensity at starting point of discharge is used, a high density and stable condition of plasma can be maintained and a thin film formation in high quality can be achieved by employing the condition of discharge determined in the present invention.

The electric field intensity at starting point of discharge IV (½ Vp-p) is about 3.7 kV/mm if nitrogen gas is provided as the first discharge gas. Accordingly, in the above relationship, a plasma can be generated by application of the first high frequency electric field V1≧3.7 kV/mm and activating nitrogen gas.

A frequency of the first power source should be less than 200 kHz. Those electric field waves can be either continuous waves or pulse waves and the frequency should be about 1 kHz in the lower limit.

On the other hand, a frequency of the second power source should be 800 kHz or higher. A good quality thin film with thickness uniformity and good adhesion with strength can be obtained by occurrence of increase in plasma density with frequency of the second power source and the frequency should be about 200 MHz in the upper limit.

An application of high frequency electric fields through those two power sources is necessary to start discharging the first discharge gas having a high electric field intensity at start of discharge generated by the first high frequency electric field and an important point in the present invention includes that a dense and good quality thin film can also be prepared by increasing in plasma density with high frequency in the second high frequency electric field and with high power density.

A power density generated by the second high frequency electric field can also be increased with a discharge uniformity which remains unchanged by increasing a power density generated by the first high frequency electric field. Further uniformity and high density plasma can be generated and a balance between further increased rate of thin film deposition and a high quality of thin film can be herewith achieved.

In the atmospheric pressure plasma discharge treatment equipment mentioned in the present invention, the first filter is used for an easy current of the first high frequency electric field running through the first electrode from the first power source and for a difficult current of the second high frequency electric field running through the first power source from the second power source by grounding the current of the second high frequency electric field. In the case of the second filter, it works the other way. The second filter is used for an easy current of the second high frequency electric field running through the second electrode from the second power source and for a difficult current of the first high frequency electric field running through the second power source from the first power source by grounding the current of the first high frequency electric field. If filters with those properties are provided, they can be used without limitation, in the present invention.

For example, capacitors of several tens of pF to tens of thousands of pF or inductors of a few μH, matched with the second power source, can be employed for the first filter. Inductors of larger than 10 μH, matched with the first power source, can be used for the second filter. This structure can be used as a filter by grounding via those capacitors and inductors.

As explained above, a thin film can be prepared onto the base material in the atmospheric pressure plasma discharge treatment equipment by exposing the base material which is placed between the aforementioned electrodes or transferred between those electrodes in gas at the state of plasma after a discharge occurs in the space between electrodes and gas introduced into the space becomes plasma. There is another atmospheric pressure plasma discharge treatment equipment employed with jet technique by which a thin film can also be prepared onto the base material (placed or transferred) by exposing the base material positioned close to electrodes facing each other and by spewing out an activated gas or plasma in jet-spray outside the space between electrodes facing each other after a discharge occurs in the space between electrodes and gas introduced into the space is activated or becomes plasma.

Hereinafter, preferred embodiments of the present invention are described with referent to the drawings. But, the scope of the invention is not limited by the drawings indicated.

FIG. 1 shows a cross-section drawing of the screen structure of the display apparatus. The screen of the display apparatus is composed of front plane 1, lenticular lens 2, and fresnel lens 3. Front plane 1 is placed on frontside of display (viewer's side of display). Lenticular lens 2 is placed behind front plane 1. Fresnel lens 3 is placed behind lenticular lens 2.

As illustrated in the enlarged drawing of FIG. 1, frontplane 1 has a hard coat film 5, an anti-reflection film 6, and an antifouling film 7, prepared in this order, on front plane of the base material 4 which is thicker than 1 mm in thickness. Front plane 1 as this front plane in the present invention can be utilized for all known display apparatuses such as projection display, liquid crystal display, plasma display, EL (Electro Luminescent) display, and CRT (CathodeRay Tube) display.

Figure 8:
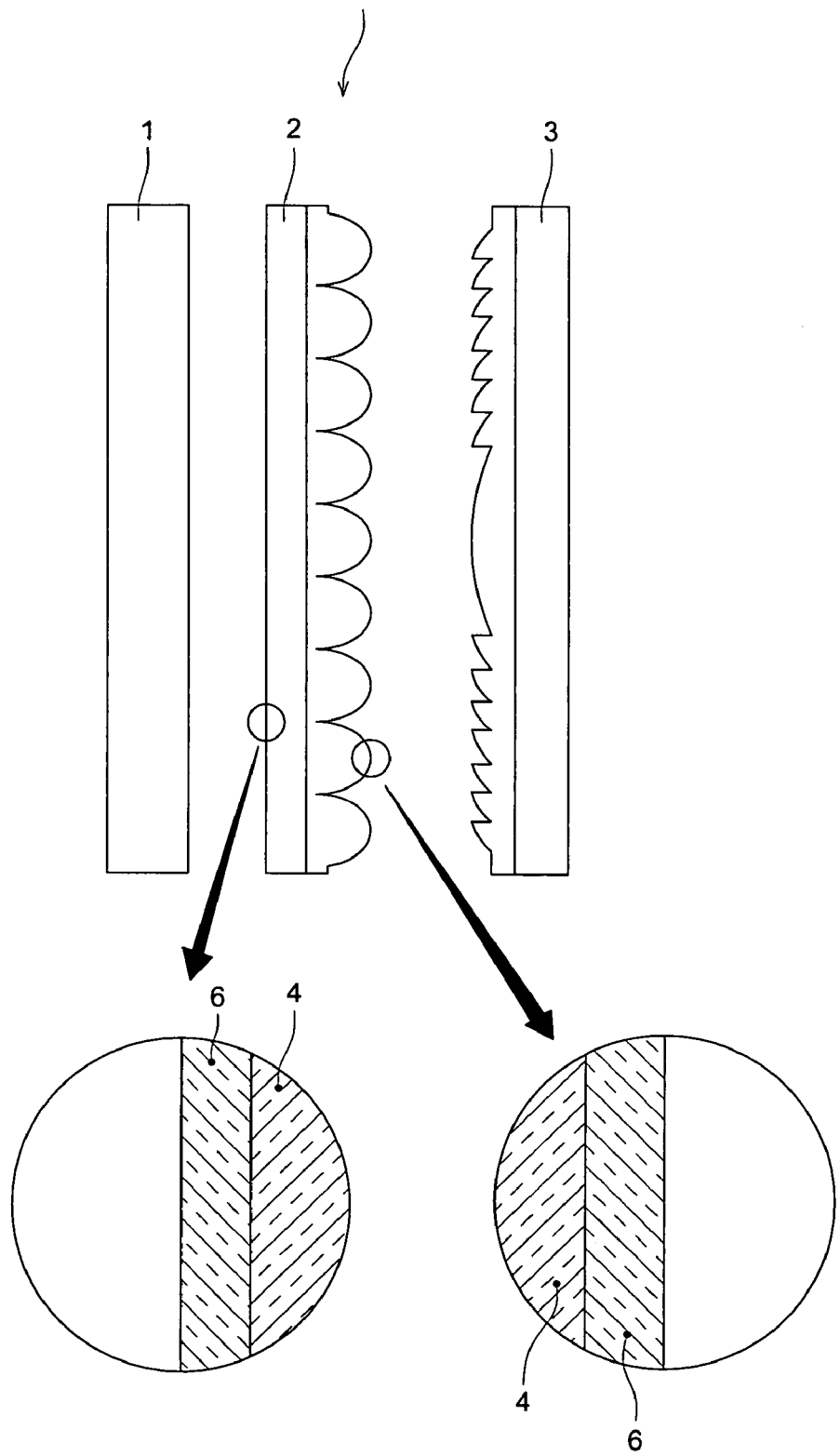

Some explanation concerning lenticular lens 2 is made here. As illustrated in the enlarged drawing of FIG. 8, lenticular lens 2 has a structure wherein anti-reflection films 6 are prepared on both surfaces on the front and rear side of the base material 4. Lenticular lens 2 as a display lenticular lens relating to the present invention is applicable to all the well-known display apparatuses and is applied for a lenticular lens of a projection display, for example.

Some explanation concerning fresnel lens 3 is made here. As illustrated in the enlarged drawing of FIG. 9, fresnel lens 3 has a structure wherein anti-reflection films 6 are prepared on both surfaces on the front and rear sides of the base material 4. Fresnel lens 3 as a display fresnel lens relating to the present invention is applicable to all the well-known display apparatuses and is applied for a fresnel lens of a projection display, for example.

The base material 4 is not limited if thin films (hard coat film 5, anti-reflection film 6, and antifouling film 7) can be deposited on surfaces of planar shape material such as a plate, a sheet, and a film and also of 3-dimensional shape material such as lenses. Shape and material of the basematerial 4 are not limited if uniformity in thin films 6 and 7 can be formed by exposing the base material which is placed or transferred in the mixed gas in the state of plasma. Both planar shapes and 3-dimensional shapes are accepted. The base material 4 is also not limited as long as thin films can be formed on the surface of lenticular lens 2 and fresnel lens 3. Glass plates and resin plates as planar shapes can be used. Glass, resin, ceramic, metal, non-metal and others as materials can also be used. Specifically glass plates and lenses as glass and resin lenses, resin films, resin sheets, and resin plates as resin can be given.

Materials composed of resin for the base material 4 such as polyolefin type (polyethylene, polypropylene), cyclopolyolefine type, polyester type (polyethylene terephthalate, polyethylene naphthalate, and so forth), polyamide type (nylon-6, nylon-66 and so forth), polystyrene, polyvinyl chloride, polyimide, polycarbonate, polyvinyl alcohol, ethylenevinyl alcohol, acrylic, cellulose type (triacetyl cellulose, diacetyl cellulose, cellophane, and so forth) or copolymers like organic polymers composed of those resins mentioned above can be used in consideration of optical properties such as transparency, refractive index, and dispersion and other properties such as impact resistance, heat resistance, and durability.

Hard coat film 5, which is a known film, prevents the base material 4 from getting scratched and it is composed of inorganic hard coat agent, organic hard coat agent, organic-inorganic hybrid coat agent and so forth.

Anti-reflection film 6 is a film having a function of preventing an incident light, heading for the base material 4 from the front side of front plane 1 from reflection (in the case of lenticular lens and fresnel lens, from the front or rear side of lenticular lens 2 or fresnel lens 3), and it is composed of either a single layer or a plurality of layers having different refractive indices which are laminated. Anti-reflection film 6 is a film deposited on hard coat film 5 (in the case of lenticular lens and fresnel lens, on the base material 4) when gas G (refer to FIG. 2) containing the first gas for thin film formation to a discharge space is provided under the atmospheric pressure or the pressure close to it, gas G with high frequency electric field applied in the discharge space is activated, and the base material in the state of activated gas G is exposed.

Antifouling film 7 is a film having an antifouling function like water-repelling and it contains an organometallic compound having an organic group with fluorine atoms. Antifouling film 7 is a film deposited on anti-reflection film 6 of the base material 4 when the second discharge gas G2 (refer to FIG. 6) is introduced into a discharge space under the atmospheric pressure or the pressure close to it and the base material 4 is exposed in an indirect activated gas after the indirect activated gas is prepared by bringing the activated second discharge gas G2 into contact with the second gas M2 (refer to FIG. 6) for thin film formation containing an organometallic compound having an organic group with fluorine atoms outside the discharge space.

Front plane 1 has hard coat film 5, antifouling film 7, and anti-reflection film 6 deposited only on one side of front plane. But, those films may be deposited on the other (rear) side of front plane. And also hard coat film 5 may be deposited as well as not be deposited on the base material 4 of front plane 1.

Though anti-reflection films 6 are prepared on both the front and rear surfaces of the base material 4 for lenticular lens 2 or fresnel lens 3, lenticular lens 2 or fresnel lens 3 may have a structure where anti-reflection film 6 is prepared at least on one surface of both the front and rear surfaces of the base material 4. An antifouling film containing organometallic compounds having organic groups with fluorine atoms can be given as an example of antifouling film.

Figure 2:
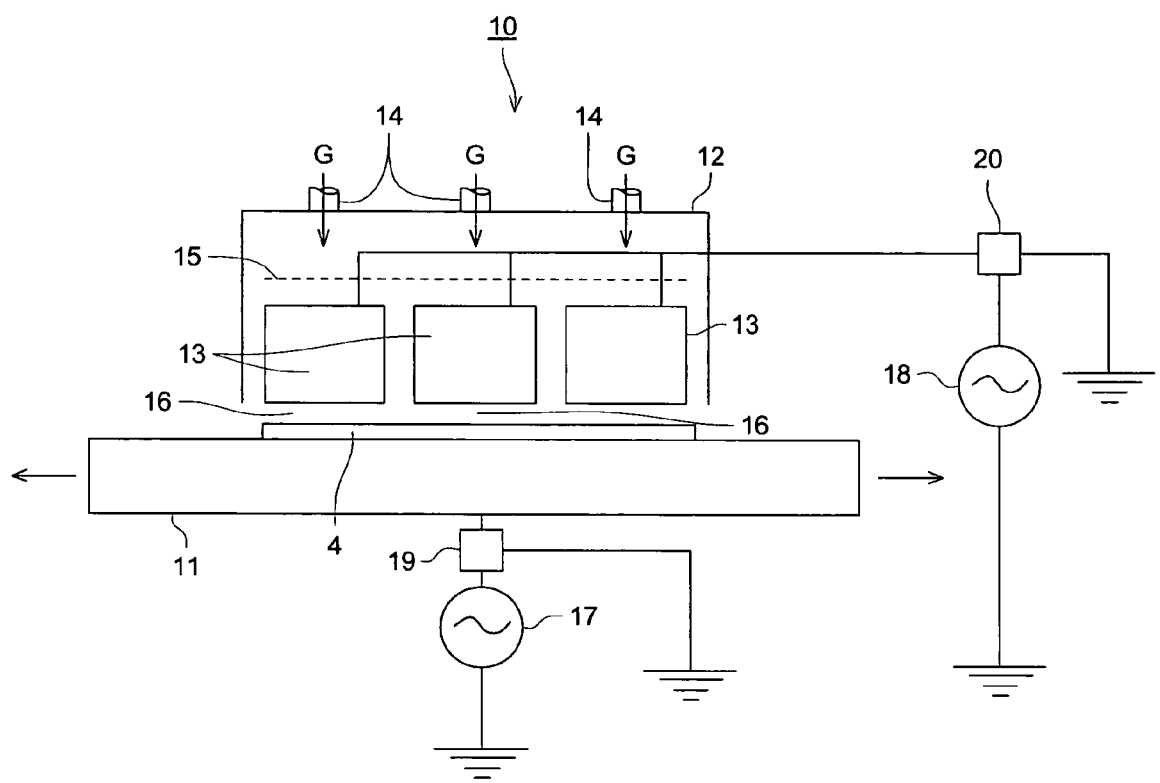
FIG. 2 is a cross-section diagram showing the schematic structure of an atmospheric pressure plasma discharge treatment equipment.

Atmospheric pressure plasma discharge treatment equipment 10 by which an anti-reflection film 6 is prepared on the base material 4 of front plane 1, lenticular lens 2, or fresnel lens 3 will be explained after this in reference to FIG. 2 to FIG. 5. As shown in FIG. 2, atmospheric pressure plasma discharge treatment equipment 10 has a stage electrode 11 with a long and flat plane. Plasma discharge vessel 12 which is open up on the lower side is situated on the upper side of stage electrode 11 as the first electrode. A plurality of rectangular cylinder-shaped electrodes 13 placed inside plasma discharge vessel 12 are situated on the upper side of stage electrode 11.

Figure 3:
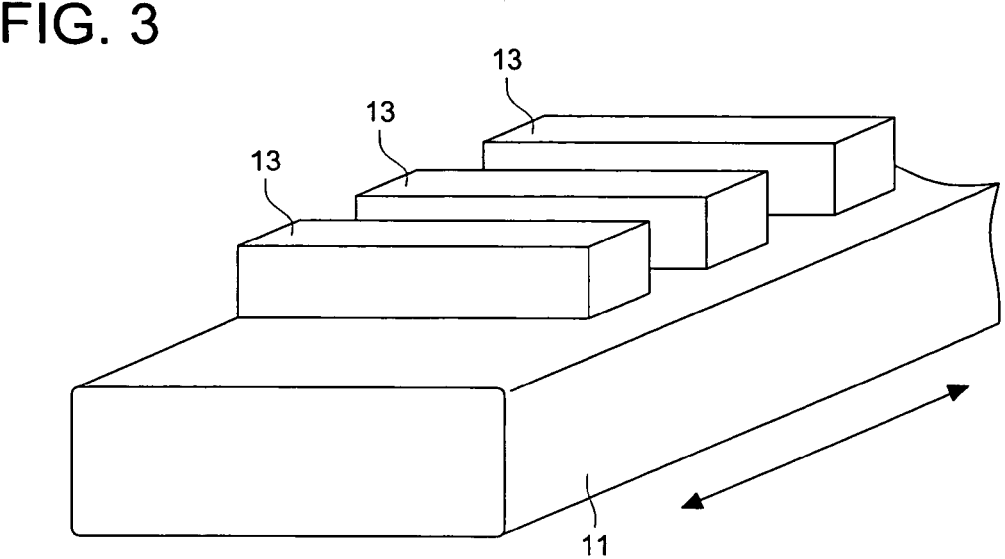
FIG. 3 is a perspective view showing positional relationship between a stage electrode and each rectangular cylinder-shaped electrode.

As shown in FIG. 2 and FIG. 3, each rectangular cylinder-shaped electrode 13 as the second electrode and stage electrode 11 which are facing each other are situated at a given spacing and it is also seen that the atmospheric pressure plasma discharge treatment equipment 10 is composed of facing electrodes of stage electrode 11 and each rectangular cylinder-shaped electrode 13. Stage electrode 11 is connected to a drive mechanism (Diagram omitted) and the reciprocating motion of stage electrode 11 is possible with an action of the drive mechanism (Refer to arrows shown in FIG. 2 and FIG. 3).

Figure 4:
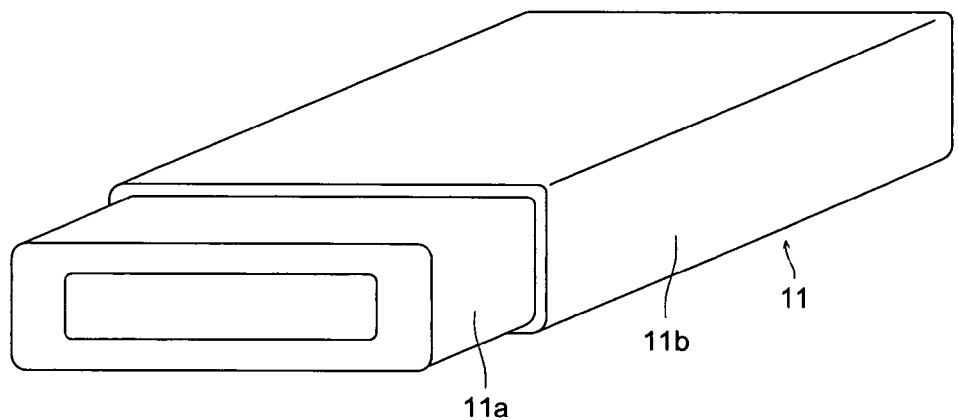
FIG. 4 is a perspective view showing a stage electrode.
Figure 5:
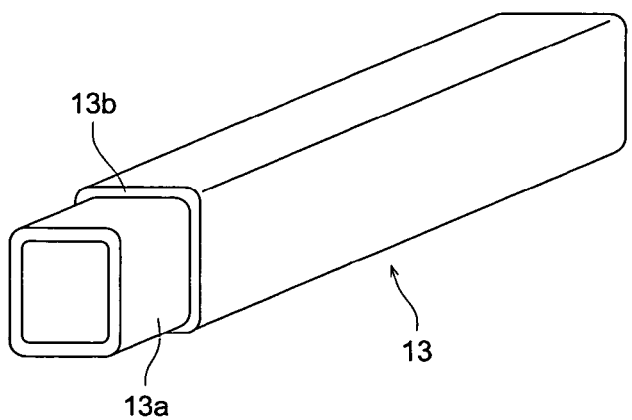
FIG. 5 is a perspective view showing a rectangular cylinder-shaped electrode.

As shown in FIG. 4, stage electrode 11 has a structure of a long and flat plane of metallic base material 11a coated by dielectric 11b. As shown in FIG. 5, rectangular cylinder-shaped electrode 13 has a structure of metallic base material 13a coated by dielectric 13b. Stage electrode 11 and each rectangular cylinder-shaped electrode 13 will hereinafter be described in detail.

Stage electrode 11 and each rectangular cylinder-shaped electrode 13 are both hollow centered. Media for temperature control such as water and silicon are circulated in hollow regions of stage electrode 11 and each rectangular cylinder-shaped electrode 13. Atmospheric pressure plasma discharge treatment equipment 10 has also a mechanism by which stage electrode 11 and each rectangular cylinder-shaped electrode 13 can be controlled in temperature.

As shown in FIG. 1, three gas supply ports 14 are situated on the upper side of plasma discharge vessel 12 and mesh 15 designed to uniformize the flow velocity of gas G introduced inside plasma discharge vessel 12 is situated on the upper side of each rectangular cylinder-shaped electrode 13 in plasma discharge vessel 12. Gas G is introduced inside plasma discharge vessel 12 from each gas supply port 14. Atmospheric pressure plasma discharge treatment equipment 10 has also a mechanism by which gas G is introduced into discharge space 16 between stage electrode 11 and each rectangular cylinder-shaped electrode 13 via mesh 15.

Stage electrode 11 is connected to the first power source 17 and the first high frequency electric field with frequency $\omega 1$, electric field intensity V1, and current I1, generated by the first power source 17, is applied in discharge space 16 between stage electrode 11 and each rectangular cylinder-shaped electrode 13, while each rectangular cylinder-shaped electrode 13 is connected to the second power source 18 and the second high frequency electric field with frequency $\omega 2$, electric field intensity V2, and current I2, generated by the second power source 18, is applied in discharge space 16 between stage electrode 11 and each rectangular cylinder-shaped electrode 13.

The first filter 19 is placed between stage electrode 11 and the first power source 17. It is designed so that the current passing through stage electrode 11 from the first power source 17 runs easily with the installation of filter 19 and the current passing through the first power source 17 from the second power source 18 does not run easily with grounding the current running through from the second power source 18. The second filter 20 is also placed between each rectangular cylinder-shaped electrode 13 and the second power source 18. It is designed so that the current passing through each rectangular cylinder-shaped electrode 13 from the second power source 18 runs easily with the installation of filter 20 and the current passing through the second power source 18 from the first power source 17 does not run easily with grounding the current running through from the first power source 17.

The first power source 17 should have larger high frequency electric field intensity (V1>V2) applied than the Second power source 18. In addition, $\omega 1<\omega 1$ can be obtained in frequency relationship between the first power source 17 and the second power source 18.

The relationship of the current obtained through the first power source 17 and the second power source 18 should be I1<I2. Current I1 of the first high frequency electric field should be 0.3–20 mA/cm². It is preferably 1.0–20 mA/cm². And also, Current I2 of the second high frequency electric field should be 10–100 mA/cm². It is preferably 20–100 mA/cm².

As for atmospheric pressure plasma discharge treatment equipment 10, each rectangular cylinder-shaped electrode 13 may be connected to stage electrode 11 via the first filter 19 and the second power source 18 may also be connected to stage electrode 11 via the second filter 20.

Each of stage electrode 11 and each rectangular cylinder-shaped electrode 13 is one wherein a sealing process was taken with an inorganic compound as a sealing material after spraying ceramics as dielectric 11b, 13b on those conductive, metallic base materials 11a, 13a. Approximately 1 mm of one side coated of ceramics dielectric is good enough. Ceramics utilized for spraying such as Alumina and silicon nitride are preferably used and it is especially preferable to use alumina among those since it can be easily processed. Dielectric layers 11b, 13b may also be made of lining treatment dielectric materials with inorganic compounds.

Conductive metallic base materials 11a, 13a can be titanium metal, titanium alloy, other metals such as silver, platinum, stainless steel, aluminum, and iron, composite materials made of iron and ceramics, and composite materials made of aluminum and ceramics. It is especially preferable to use titanium metal and titanium alloy among those in consideration of the reason described later.

A distance between facing electrodes of stage electrode 11 and rectangular cylinder-shaped electrode 13 is meant to be the shortest distance between the dielectric surface of one electrode and the conductive, metallic base material of the other electrode in the case of dielectrics employed. The distance between electrodes can be the shortest distance between both dielectric surfaces in the case of dielectric materials employed on both electrodes. A distance between electrodes is determined in consideration of the thickness of dielectric material prepared on the conductive, metallic base material, electric field intensity applied, and the purpose in use of plasma and it is preferable from the aspect of a uniform discharge generated that the distance between electrodes is in a range of 0.1–20 mm. It is especially preferable that it is in a range of 0.5–2 mm.

Dielectric 11b, 13b and conductive, metallic base materials 11a, 13a are hereinafter described in detail.

A treatment vessel made of pyrex (R) for plasma discharge vessel 12 is preferably used. A treatment vessel made of metal can also be used if insulation between stage electrode 11 and rectangular cylinder-shaped electrode 13 is obtained. For example, Polyimide resin may be stuck on the inner surface of aluminum or stainless steel frame and insulation may also be obtained by spraying ceramics to the metal frame.

Following high frequency power sources as the first power source 17 installed in atmospheric pressure plasma discharge treatment equipment 10 are commercially available and any one of them can be used.

| Applied power source mark | Manufacturer | Frequency | Product number |
|---|---|---|---|
| A1 | Shinko Electric Co., Ltd | 3 kHz | SPG3-4500 |
| A2 | Shinko Electric Co., Ltd | 5 kHz | SPG5-4500 |
| A3 | Kasuga Electric Co., Ltd | 15 kHz | AGI-023 |
| A4 | Shinko Electric Co., Ltd | 50 kHz | SPG50-4500 |
| A5 | Haiden Laboratory Inc. | 100 kHz* | PHF-6k |
| A6 | Pearl Kogyo Co., Ltd | 200 kHz | CF-2000-200k |
| A7 | Pearl Kogyo Co., Ltd | 400 kHz | CF-2000-400k |

Following high frequency power sources as the second power source 18 are commercially available and any one of them can be used without any problem.

| Applied power source mark | Manufacturer | Frequency | Product number |
|---|---|---|---|
| B1 | Pearl Kogyo Co., Ltd | 800 kHz | CF-2000-800k |
| B2 | Pearl Kogyo Co., Ltd | 2 MHz | CF-2000-2M |
| B3 | Pearl Kogyo Co., Ltd | 13.56 MHz | CF-5000-13M |
| B4 | Pearl Kogyo Co., Ltd | 27 MHz | CF-2000-27M |
| B5 | Pearl Kogyo Co., Ltd | 150 MHz | CF-2000-150M |

A power source indicated by * among the above power sources means an impulse high frequency power source (100 kHz in continuous mode) manufactured by Haiden Laboratory Inc.

As for the present invention, it is preferable that stage electrode 11 and rectangular cylinder-shaped electrode 13, by which a uniform and stable condition of discharge can be maintained, are employed in atmospheric pressure plasma discharge treatment equipment 10.

As for the present invention, a power density higher than 1 W/cm$^2$ is provided to each rectangular cylinder-shaped electrode 13 through the power between stage electrode 11 and rectangular cylinder-shaped electrode 13 and thin films are prepared by generating a plasma with the first discharge gas activated and by giving an energy to the first gas for thin film formation. The upper limit of power density provided to the second electrode 18 (the second high frequency electric field) should be 50 W/cm$^2$ and it is preferably 20 W/cm$^2$. The lower limit should be 1.2 W/cm$^2$ preferably. In addition, discharge area (cm$^2$) is meant to be a summation of areas in the range where discharge takes place through each rectangular cylinder-shaped electrode 13.

A power density higher than 1 W/cm$^2$ is also provided to the first electrode 17 (the first high frequency electric field) and the power density can be increased with maintaining uniformity in the second high frequency electric field. This can generate further uniform, high density plasma and competing goals for further increase in deposition rate and improved quality in films can be achieved. The power density should be higher than 5 W/cm$_2$ preferably. The upper limit of power density provided to the first electrode 17 (the first high frequency electric field) should be 50 W/cm$^2$ preferably.

A waveform of high frequency electric field is not especially limited though there are a continuous oscillation mode in sine wave called continuous mode and an ON/OFF intermittent oscillation mode called pulse mode. Either mode can be employed. But, the continuous oscillation mode in sine wave is preferable for the side of each rectangular cylinder-shaped electrode 13 (the second high frequency electric field) since dense high-quality films can be obtained.

Stage electrode 11 and each rectangular cylinder-shaped electrode 13 used for a thin film formation method using such an atmospheric pressure plasma must be durable against heavy-duty conditions in both structure and performance. Those stage electrode 11 and each rectangular cylinder-shaped electrode 13 should have dielectric 11b, 13b coated on metallic base material 11a, 13a.

As for stage electrode 11 and each rectangular cylinder-shaped electrode 13 which are used in the present invention, various metallic base materials 11a, 13a and dielectrics 11b, 13b should be matched in properties and one of the properties is about a combination of metallic base materials 11a, 13a and dielectrics 11b, 13b with less than 10×10$^{-6}$/° C. which is a difference in coefficient of linear thermal expansion between aforementioned materials. The difference of not more than 8×10$^{-6}$/° C. is preferable, that of not more than 5×10$^{-6}$/° C. is more preferable, and that of not more than 2×10$^{-6}$/° C. is further more preferable. Incidentally, the coefficient of linear thermal expansion is one of the well-known physical properties specific to materials.

The combination of conductive, metallic base material 11a, 13a and dielectrics 11b, 13b coupled with the difference in coefficient of linear thermal expansion which is within the range stated above is listed as follows.

1: Pure titanium or titanium alloy as metallic base material 11a, 13a and coated ceramics sprayed as dielectric 11b, 13b
2: Pure titanium or titanium alloy as metallic base material 11a, 13a and glass lining as dielectric 11b, 13b
3: Stainless steel as metallic base material 11a, 13a and coated ceramics sprayed as dielectric 11b, 13b
4: Stainless steel as metallic base material 11a, 13a and glass lining material as dielectric 11b, 13b
5: Composite material of ceramics and iron as metallic base material 11a, 13a and coated ceramics sprayed as dielectric 11b, 13b
6: Composite material of ceramics and iron as metallic base material 11a, 13a and glass lining material as dielectric 11b, 13b
7: Composite material of ceramics and aluminum as metallic base material 11a, 13a and coated ceramics sprayed as dielectric 11b, 13b
8: Composite material of ceramics and aluminum as metallic base material 11a, 13a and glass lining material as dielectric 11b, 13b From the aspect of the difference in coefficient of linear thermal expansion, the above item 1 or item 2 and items 5–8 are preferable. Item 1 is especially preferable.

As for the present invention, titanium or titanium alloy as metallic base material 11a, 13a are especially useful because of the aforementioned properties. Titanium or titanium alloy as metallic base material 11a, 13a and the above materials as dielectric 11b, 13b can withstand heavy duty use for long hours without degradation of stage electrode 11 and each rectangular cylinder-shaped electrode 13 in use, especially from causes of crazing, peeling, and fall-off.

Metallic base material 11a, 13a used for stage electrode 11 and each rectangular cylinder-shaped electrode 13, useful for the present invention, has to be titanium metal or titanium alloy containing 70 wt % or more in titanium. Titanium metal or titanium alloy containing 70 wt % or more in titanium can be used without any problem. But, the content of 80 wt % or more in titanium is preferable. Titanium metal or titanium alloy, useful for the present invention, such as industrial pure titanium, corrosion-resistant titanium, high-strength titanium and so forth, which are commercially available, can be used. TIA, TIB, TIC, TID, and so forth as industrial pure titanium can be given and any one of them containing 99 wt % or more in titanium contains a very small amount of iron atoms, carbon atoms, nitrogen atoms, oxygen atoms, hydrogen atoms, and so forth respectively. T15PB as corrosion-resistant titanium alloy containing not only the aforementioned atoms but lead atoms can be preferably used and it contains 98 wt % or more in titanium. T64, T325, T525, TA3, and so forth as titanium alloy containing atoms mentioned above excluding lead atoms, vanadium and tin can be preferably used and those titanium contents are 85 wt % or more in titanium. Those titanium metals or titanium alloys have the coefficient of thermal expansion that is smaller than that of stainless steel (for example, AISI316) by about a half thereof and they can withstand heavy duty use for long hours at high temperature since a combination with the after-mentioned dielectric 11b, 13b deposited on titanium metal or titanium alloy as metallic base material 11a, 13a is well matched.

As for properties required for dielectrics 11b, 13b, on one hand, they should be specifically made of inorganic compounds with relative permittivity of 6–45, and there are also ceramics such as alumina and silicon nitride or glass lining materials such as silica glass and borate glass employed as those dielectrics 11b, 13b. The after-mentioned ceramics sprayed and glass lining materials among those are preferably used. Especially dielectrics 11b, 13b prepared by spraying alumina are preferably used.

In one of the specifications concerning endurance against a large power mentioned above, the percentage of porosity of dielectric 11b, 13b should be not more than 10 vol %. It should be not more than 8 vol % preferably. It is especially preferable that it should be between 0 and 5 vol %. In addition, the percentage of porosity of dielectrics 11b, 13b can be measured by a BTE absorption technique or a mercury porosimeter. As seen in the after-mentioned example, the percentage of porosity is measured with a fragment of dielectrics 11b, 13b coated by metallic base material 11a, 13a by a mercury porosimeter (Shimadzu Corporation). A high durability can be achieved by decreasing the percentage of porosity of dielectric 11b, 13b. A high density and high adherence ceramic spray film obtained by the after-mentioned atmospheric pressure plasma spraying method and so forth can be introduced as dielectrics 11b, 13b with such a lower percentage of porosity. A sealing treatment should take place in order to decrease further the percentage of porosity.

The atmospheric pressure plasma spraying method mentioned above is a technology by which films can be formed by spraying fine particles in molten or semi-molten state to metallic base materials 11a, 13a as a coated object after fine ceramic particles, wires, and so forth are cast into a plasma heat source. The plasma heat source means a high temperature plasma gas by which electrons are emitted in further energizing after molecular gas is heated up to high temperature and dissociated into atoms. This plasma gas injection velocity is large and high density films having large strength in adherence can be obtained in higher velocity collision of thermal spray materials occurred to metallic base materials 11a, 13a, compared with conventional electric arc spraying and flame spraying techniques. A thermal spray technique by which thermal shield films are formed onto materials exposed in high temperature, explained in detail, can be referred to by Japanese Patent Publication No. 2000-301655. By this technique, the percentage of porosity of coated dielectric 11b, 13b (ceramic thermal spray film), mentioned above, can be obtained.

As for another preferable specification concerning endurance against a large power, the thickness of dielectric 11b, 13b has to be 0.5–2 mm. The variation in thickness should be not more than 5%. Not more than 3% is preferable and not more than 3% is especially preferable.

A sealing treatment with an inorganic compound processed further on a thermal spray ceramic film, described above, should take place in order to decrease further the percentage of porosity of dielectric 11b, 13b. Metallic oxides in the aforementioned inorganic compounds can be preferably used and especially those containing silicon oxide ($SiO_x$) as a main component can be preferably used.

It is preferable that inorganic compounds used for a sealing treatment should be cured through a sol-gel reaction. In the case of inorganic compounds used for a sealing treatment which are metallic oxides as a main component, metallic alkoxide and so forth as sealing liquids are coated on the aforementioned ceramic thermal spray film and are cured through the sol-gel reaction. In the case of an inorganic compound which is silica as a main component, alkoxysilane as a sealing liquid should be employed.

Energy treatments should take place for accelerating sol-gel reactions. There are thermal curing (preferably not more than 200° C.), ultraviolet ray exposure and so forth for those treatments. As for the sealing treatment, stage electrode 11 and rectangular cylinder-shaped electrode 13, which are dense in structure without any degradation, can be obtained by occurrence of further mineralization if the sealing liquid is diluted and processes of coating and curing are successively repeated a couple of times.

When a sealing treatment for curing through sol-gel reactions is conducted after metallic alkoxide and so forth as sealing liquids, which are stage electrode 11 and rectangular cylinder-shaped electrode 13 coated by dielectrics 11b, 13b concerning the present invention, are coated on ceramic thermal spray films, the content of metallic oxide after curing should be 60 mol % or more. In the case of using alkoxysilane as metallic alkoxide of a sealing liquid, the content of $SiO_x$ after curing (x is not more than 2) should be 60 mol % or more. The content of $SiO_x$ after curing can be measured by X-ray photoelectron spectroscopy with analysis of the layer fault of dielectrics 11b, 13b.

As for stage electrode 11 concerning the thin film formation method in the present invention, it is preferable to be adjusted so that the maximum height of surface roughness, specified by JIS B 0601, on the side keeping in contact with at least the base material 4 of stage electrode 11 may be not more than 10 μm in order to have a positive effect described in the present invention. The maximum height of surface roughness not more than 8 μm is preferable and not more than 7 is especially preferable. By a polishing finish of the surface of dielectric 11b on stage electrode 11, the thickness of dielectric 11b and the gap between stage electrode 11 and rectangular cylinder-shaped electrode 13 can be held constant, discharge conditions can be stabilized, the strain and crazing from a thermal shrinkage difference and a residual stress can also be eliminated, and a high degree of accuracy and durability can be greatly improved. It is preferable that the polishing finish of the surface of dielectric 11b is conducted to dielectric 11b situated on the side having contact with at least the base material 4. In addition, a center line surface roughness (Ra), specified by JIS B 0601, should be less than 0.5 μm. Less than 0.1 μm is especially preferable.

As for stage electrode 11 and each rectangular cylinder-shaped electrode 13 coated by dielectrics 11b, 13b used for the present invention, a heat resistant temperature in another preferable specification concerning endurance against a large power should be 100° C. or higher. The upper limit in heat resistant temperature is 500° C. though the heat resistant temperature 120° C. or higher is preferable and 150° C. or higher is especially preferable. Heat resistant temperature means the highest temperature endurable for normal discharge conditions without any insulation breakdown against voltage used for the atmospheric pressure plasma treatment. Such a heat resistant temperature can be achieved by appropriately combining means such as an introduction of the ceramic thermal spray mentioned above, an application of dielectrics 11b, 13b prepared by the glass lining with layers having a different amount of foams contained in quantity, and a selection of materials within the range of a difference in coefficient of linear thermal expansion between the above metallic base materials 11a, 13a and dielectrics 11b, 13b.

[Gas G] provided to discharge space 16 is explained here. Gas G provided to discharge space 16 contains at least the first discharge gas and the first gas for thin film formation. The first discharge gas and the first gas for thin film formation may be mixed and provided. Those gases may also be provided separately.

"The first discharge gas" means gas by which a glow discharge leading to thin film formation can be generated. There are nitrogen, inert gas, air, hydrogen gas, oxygen, and so forth as the first discharge gas. These gases may either be used independently as the first discharge gas, or be used after mixed. As for the present invention, the first discharge gas, which is preferable, is nitrogen gas. It is preferable that 50–100 vol % of the first discharge gas is nitrogen gas. It is also preferable that inert gas containing not more than 50 vol % is used as the first discharge gas other than nitrogen and the first discharge gas divided by the total gas in quantity, which is provided to the discharge space, in terms of percentage should be 90–99.9 vol %.

"The first gas for thin film formation" is a source gas from which thin films, chemically deposited on the base film 4, are made after the gas itself is excited and activated.

Gas G provided to discharge space 16 for thin film formation, which is used for the present invention, is explained here. Addition gases may sometimes be provided, though the first discharge gas and the first gas for thin film formation are basically used. The first discharge gas divided by the total gas in quantity, which is provided to discharge space 16, should be 90–99.9 vol %.

As the first gas for thin film formation which is used for the present invention, there are given organometallic compounds, halogenated metallic compounds, and metallic hydrogen compounds.

It is preferable that organometallic compounds, useful for the present invention, can be shown in the general formula (I).

$$R^1_x M R^2_y R^3_z \quad (I)$$

As seen in the general formula (I), M is metal, $R^1$ is alkyl group, $R^2$ is alkoxy group, $R^3$ is a group selected from β-diketone complex group, β-ketocarboxylic acid ester complex group, β-ketocarboxylic acid complex group, and ketooxine group (ketooxine complex group). When valence in metal M is m, x+y+z=m, x=0 to m or x=0 to m−1, y=0 to m, z=0 to m, and any one of them is 0 or a positive integer. Methyl group, ethyl group, propyl group, and butyl group as alkyl group of $R^1$ can be given. Methoxy group, ethoxy group, propoxy group, butoxy group, 3,3,3-trifluoropropoxy group and so forth as alkoxy group of $R^2$ can be given. Hydrogen atoms in alkyl group substituted to fluorine atoms may also be accepted. As for group selected from β-diketone complex group, β-ketocarboxylic acid ester complex group, β-ketocarboxylic acid complex group, and ketooxine group (ketooxine complex group) of $R^3$, as β-diketone complex group, for example, 2,4-pentanedione, which is called acetylacetone or acetoacetone, 1,1,1,5,5,5-hexamethyl-2,4-pentanedione, 2,2,6,6-tetramethyl-3,5-heptanedione, 1,1,1-trifluoro-2,4-pentanedione and so forth can be given, as β-ketocarboxylic acid ester complex group, for example, methyl acetoacetate ester, ethyl acetoacetate ester, propyl acetoacetate ester, trimethyl ethyl acetoacetate, trifluoro methyl acetoacetate and so forth can be given, and as ketooxine group, for example, acetooxine group (or acetoxy group), propionyloxine group, butyryloxy group, acryloyloxy group, methacryloyloxy group, and so forth can be given. The atomic number of carbon of those groups with inclusion of organometallic compounds mentioned above is preferably not more than 18. As shown in the examples, both normal chain and branch may be accepted and hydrogen atoms substituted to fluorine atoms may also be accepted.

As for a possible problem in handling, riskless organometallic compounds against explosion should be used and those organometallic compounds which possess at least one oxygen atom or more within a molecule should be used. As for those compounds, organometallic compounds which contain at least one alkoxy group of $R^2$ and metallic compounds possessing at least one group selected from β-diketone complex group, β-ketocarboxylic acid ester complex group, β-ketocarboxylic acid complex group, and ketooxine group (ketooxine complex group) of $R^3$ should also be used.

Specific metallic compounds will hereinafter be described. As for the present invention, addition gases other than the first discharge gas and the first gas for thin film formation as gas G provided to discharge space 16 may be mixed in order to accelerate reactions for thin film formation. Oxygen, ozone, hydrogen peroxide, carbon dioxide, carbon monoxide, hydrogen, ammonia as addition gases are given. But, Oxygen, carbon monoxide, and hydrogen are preferably used and a mixture of components selected from those is recommended. The content divided by the total gas in quantity should be 0.01–5 vol %. Reactions are accelerated by those conditions and high quality, dense thin films can be prepared.

The preferable thickness of oxide and composite compound films, mentioned above, is in the range of 0.1–1000 nm.

In the present invention, Li, Be, B, Na, Mg, Al, Si, K, Ca, Sc, Ti, V, Cr, Mn, Fe, Co, Ni, Cu, Zn, Ga, Ge, Rb, Sr, Y, Zr, Nb, Mo, Cd, In, Ir, Sn, Sb, Cs, Ba, La, Hf, Ta, W, Tl, Pb, Bi, Ce, Pr, Nd, Pm, Eu, Gd, Tb, Dy, Ho, Er, Tm, Yb, Lu, and so forth can be given here as metals of organometallic compounds, halogenated metals, and metallic hydrogen compounds used for the first gas for thin film formation.

As for the method of thin film formation in the present invention, various highly functional thin films can be obtained by using metallic compounds such as organometallic compounds, halogenated metallic compounds, metallic hydrogen compounds, and so forth, mentioned above, with the first discharge gas. Thin film samples concerning the present invention are shown below. But, the present invention applied is not limited only to those samples.

Electrode film: Au, Al, Ag, Ti, Pt, Mo, Mo—Si
Dielectric protective film: $SiO_2$, SiO, $Si_3N_4$, $Al_2O_3$, $Y_2O_3$
Transparent electrical conduction film: $In_2O_3$, $SnO_2$
Electrochromic film: $WO_3$, $IrO_2$, $MoO_3$, $V_2O_5$
Fluorescent screen: ZnS, ZnS+ZnSe, ZnS+CdS
Magnetic recording film: Fe—Ni, Fe—Si—Al, γ-$Fe_2O_3$, Co, $Fe_3O_4$, Cr, $SiO_2AlO_3$
Super conducting film: Nb, Nb—Ge, NbN
Solar cell film: a-Si, Si
Reflection film: Ag, Al, Au, Cu
Selectively absorbing film: ZrC—Zr
Selectively transmitting film: $In_2O_3$, $SnO_2$
Anti-reflection film: $SiO_2$, $TiO_2$, $SnO_2$
Shadow mask: Cr
Wear resistance film: Cr, Ta, Pt, TiC, TiN
Corrosion resistance film: Al, Zn, Cd, Ta, Ti, Cr
Heat resistance film: W, Ta, Ti
Lubricating film: $MoS_2$
Decoration film: Cr, Al, Ag, Au, TiC, Cu A degree of nitriding in nitride, a degree of oxidation in oxide, a degree of sulfidity in sulfide, and a degree of carbonization in carbide, mentioned above, are simply for case examples and the composition ratio with metal may be appropriately changed. Impurities of carbon compounds, nitrogen compounds, and hydrogen compounds other than metallic compounds, mentioned above, can be contained in thin films.

As for the present invention, metals in metallic compounds, which are especially preferable, are Si, Ti, Sn, Zn, In, and Al and organometallic compounds given by the aforementioned general formula (I) among metallic compounds bonded to those metals are preferable. Examples of organometallic compounds will be given later.

Figure 6:
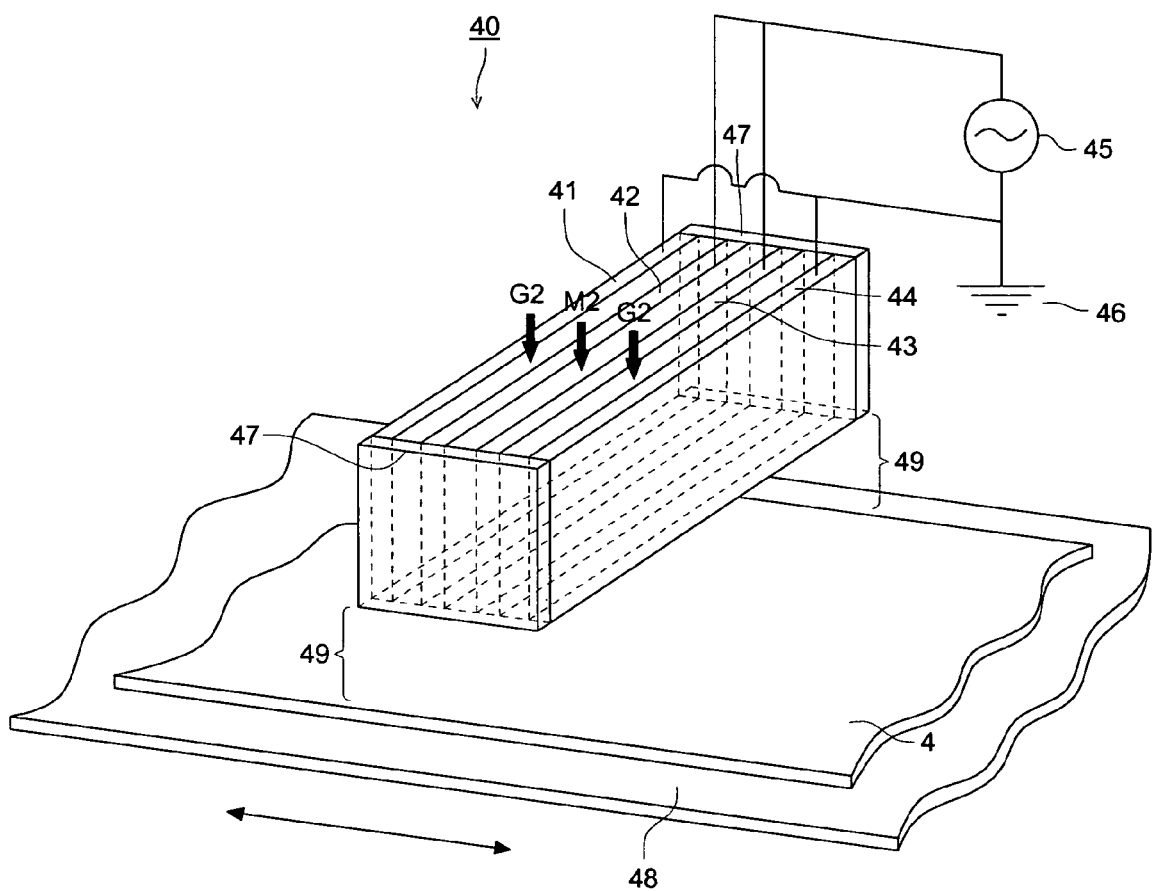
FIG. 6 is a perspective view showing the schematic structure of an atmospheric pressure plasma discharge treatment equipment for antifouling film formation.

Eeferring to FIG. 6, atmospheric pressure plasma discharge treatment equipment 40 by which antifouling film 7 is formed on the base material 4 in front plane 1 will be explained here. As shown in FIG. 6, four pieces of plane electrodes 41, 42, 43, and 44 are installed in atmospheric pressure plasma discharge treatment equipment for antifouling film formation 40 and a side of each of plane electrodes 41–44 is blocked by a square-shaped lid 47. Plane electrodes 42–43 are connected to high frequency power source 45 and plane electrodes 41, 44 are connected to grounding 46. In atmospheric pressure plasma discharge treatment equipment for antifouling film formation 40, a pair of facing electrodes are composed of plane electrodes 41–42 and another pair of facing electrodes are composed of plane electrodes 43–44 respectively.

Each of plane electrodes 41–44 is composed of a metallic base material and a dielectric. It may be composed of a combination of the base material processed by lining and the coated dielectric with inorganic property. It may also be composed of a combination of the base material processed by ceramic thermal spray and the coated dielectric subsequently done by sealing treatment using material with inorganic property. Metals such as silver, platinum, stainless steel, aluminum, iron, titanium, copper, gold, and so forth as metallic base materials can be used. Silicate glass, borate glass, phosphate glass, germanate glass, tellurite glass, aluminate glass, vanadate glass, and so forth as dielectric lining materials can be employed and borate glass among those glasses, which can be easily processed, is preferably used. Alumina as a ceramic used for dielectric thermal spray is preferably used and a sealing treatment should be taken by silicon oxide. As for the sealing treatment, alkoxysilane sealing material can be mineralized by sol-gel reactions.

As for plane electrodes 41–42 facing each other, it is enough that the metallic base material of at least one electrode of them is coated by dielectric. Similarly, as for plane electrodes 43–44 facing each other, the metallic base material of at least one electrode of them may also be coated by dielectric.

Voltages through high frequency power source 45 can be applied respectively between plane electrodes 41–42 and between electrodes 43–44, in atmospheric pressure plasma discharge treatment equipment for antifouling film formation 40. High frequency power source 45 is not specified. As shown below, the following power sources as high frequency power source 45 can be used.

High frequency power source (3 kHz) Shinko Electric Co., Ltd.
High frequency power source (5 kHz) Shinko Electric Co., Ltd.
High frequency power source (15 kHz) Shinko Electric Co., Ltd.
High frequency power source (50 kHz) Shinko Electric Co., Ltd.
High frequency power source (100 kHz in use of continuous mode) Haiden Laboratory Inc.
High frequency power source (200 kHz) Pearl Kogyo Co., Ltd.
High frequency power source (800 kHz) Pearl Kogyo Co., Ltd.
High frequency power source (2 MHz) Pearl Kogyo Co., Ltd.
High frequency power source (13.56 MHz) Japan Electron Optics Laboratory Co., Ltd.
High frequency power source (27 MHz) Pearl Kogyo Co., Ltd.
High frequency power source (150 MHz) Pearl Kogyo Co., Ltd.
Power sources at 433 MHz, 800 MHz, 1.3 GHz, 1.5 GHz, 1.9 GHz, 2.45 GHz, 5.2 GHz, and 10 GHz in oscillation can also be employed.

In the case of antifouling film 7 formed on the base material 4, frequency in high frequency electric field applied between plane electrodes 41–42 and between plane electrodes 43–44 should be 0.5 kHz or more and not more than 2.45 GHz though it is not especially specified. Power density provided between plane electrodes 41–42 and between plane electrodes 43–44 should be 0.1 W/cm$^2$ or more and not more than 50 W/cm$^2$. Area (cm$^2$) where voltage is applied to plane electrodes 41–42 and plane electrodes 43–44 means the area within the range of discharge. Waveforms of high frequency voltage applied between plane electrodes 41–42 and between plane electrodes 43–44 may be intermittent pulse waves and also continuous sine waves which can be both accepted.

Distance between plane electrodes 41–42 and between plane electrodes 43–44 can be determined respectively in consideration of thickness in dielectric on the metallic base material, value in voltage applied, and the purpose in use of plasma. As for plane electrodes 41–42 and plane electrodes 43–44, the shortest distance between one plane electrode and dielectric formed on the other plane electrode and the distance between dielectrics formed on both plane electrodes should be 0.1–20 mm long from the aspect of a uniform discharge generated in any case. It is more preferable that those distances are 0.2–10 mm long.

As shown in FIG. 6, handler belt 48 is installed on the lower side of respective plane electrodes 41–44. The handler belt 48 constitutes a part of a belt conveyor. It may be conveyed in one direction from right to left (or from left to right) in FIG. 6 while supporting the base material 4 or conveys in two directions. As shown in FIG. 6, handler belt 48 is arranged to be away from the bottom ends of respective plane electrodes 41–44 and to face them in the condition of having a given distance.

Voltage through high frequency power source 45 in atmospheric pressure plasma discharge treatment equipment for antifouling film formation 40 is applied between plane electrodes 41–42 and at the same time between plane electrodes 43–44 and discharge spaces are formed between plane electrodes 41–42 and at the same time between plane electrodes 43–44 respectively. The second discharge gas G2 activated in those discharge spaces by introducing the gas G2 to the discharge spaces from the upper side of plane electrodes 41–42 and plane electrodes 43–44. The second gas for thin film formation M2 containing organometallic compounds having organic groups with fluorine atoms is introduced into the space between plane electrodes 42–43 since discharge in that space does not occur. Indirectly activated gas is generated by bringing the activated second discharge gas G2 into contact with the second gas for thin film formation M2 each other outside the discharge space 49 below each plane electrode 41–44 in atmospheric pressure plasma discharge treatment equipment for antifouling film formation 40 and antifouling film 7 can be formed on the surface of the base material 4 by exposing the base material 4 to this indirectly activated gas.

"The second discharge gas G2" provided to the discharge spaces between plane electrodes 41–42 and between plane electrodes 43–44 will be explained here.

The second discharge gas G2 means the gas by which a discharge can be generated. Nitrogen, inert gas, air, hydrogen, oxygen, and so forth as the second discharge gas G2 can be used. Those gases may be used independently and a mixture of those gases may also be used. The second discharge gas G2 divided by the total gas in quantity, provided to the discharge space, should be 70–100 vol %.

"The second gas for thin film formation M2" provided to the discharge space between plane electrodes 42–43 will be explained here. The second gas for thin film formation M2 means that the gas which contains an organometallic compound having an organic group with fluorine atoms and is deposited chemically on the base material 4 to form thereon antifouling film 7. Content of the aforementioned organometallic compound having an organic group with fluorine atoms divided by the second gas for thin film formation M2 in terms of percentage should be in the range of 0.001–30.0 vol %.

The second gas for thin film formation M2 can contain nitrogen, inert gas, and so on as the second discharge gas G2 explained above. In addition, 0.001–30 vol % of addition gases such as hydrogen gas, oxygen gas, nitrogen gas, air, and so forth to the second gas for thin film formation M2 may be mixed to be used.

The organometallic compound having an organic group with fluorine atoms, contained in the second gas for thin film formation M2, will be explained in detail here.

As for an organometallic compound having an organic group with fluorine atoms, organic groups containing alkyl group, alkenyl group, alyl group, and so forth with fluorine atoms can be given. The organometallic compound having an organic group with fluorine atoms employed in the present embodiment, is an organometallic compound in which those organic groups with fluorine atoms are directly bonded to metallic atoms such as silicon, titanium, germanium, zirconium, tin, aluminum, indium, antimony, yttrium, lanthanum, iron, neodymium, copper, gallium, hafnium, and so forth. Silicon, titanium, germanium, zirconium, and tin among those metals can be preferably used. It is especially preferable to use silicon and titanium. Those organic groups with fluorine atoms may be bonded to metallic compounds in any shape, and in the case of compounds with a number of metallic atoms like siloxane which possess those organic groups, for example, at least one metallic atom may possess organic groups with fluorine atoms and their positions bonded to are not restricted.

As for an organometallic compound having an organic group with fluorine atoms employed in the present embodiment, compounds, which are hereinafter shown in general formula (1), are preferable.

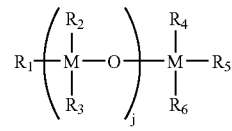

General Formula (1)

M represents Si, Ti, Ge, Zr, or Sn in general formula (1). $R_1$–$R_6$ represent a hydrogen atom or a monovalence group respectively and at least one group among groups represented by $R_1$–$R_6$ is an organic group with fluorine atoms. The organic groups which contain alkyl group, alkenyl group, or alyl group which possess fluorine atoms should be used. Trifluoromethyl group, perfluoroethyl group, perfluoropropyl group, perfluorobutyl, 4,4,3,3,2,2,1,1-octafluorobutyl group as an alkyl group with fluorine atoms, for example, can be provided. 3,3,3-trifluoro-1-propenyl group as an alkenyl group with fluorine atoms, for example, can be provided. Pentafluorophenyl group as an alyl group with fluorine atoms, for example, can also be provided. Alkoxy group, alkenyloxy group, and alyloxy group made from alkyl group, alkenyl group, and alyl group with fluorine atoms respectively can be employed.

An arbitrary number of fluorine atoms in an alkyl group, an alkenyl group, and an alyl group may be bonded at any bonding position of a carbon atom in a skeleton. But, at least one or more fluorine atoms should be bonded. Carbon atoms in skeletons of an alkyl group and an alkenyl group, for example, may also be substituted by other atoms of oxygen, nitrogen, sulfur and others and also by divalent groups including oxygen, nitrogen, and sulfur, for example, a calbonyl group, a thiocalbonyl group, and so forth.

A hydrogen atom or a monovalent group other than organic groups with fluorine atoms can be represented in the group shown by $R_1$–$R_6$. Hydroxy group, amino group, isocyanate group, halogen group, alkyl group, cycloalkyl group, alkenyl group, alyl group, alkoxy group, alkenyloxy group, alyloxy group, and so forth as a monovalent group, for example, can be given. But, those are not limited. The symbol j is represented by an integer which can be 0 to 150 and an integer of 0 to 50 is preferably used. An integer of 0 to 20 is especially preferable.

A chlorine atom, a bromine atom, and an iodine atom in the aforementioned monovalent group are preferable as a halogen atom. Alkoxy group, alkenyloxy group, and alyloxy group among those groups such as alkyl group, alkenyl group, alyl group, alkoxy group, alkenyloxy group, and alyloxy group as the monovalent group, mentioned above, are preferably used.

Si and Ti among metallic atoms, which are represented by M, are preferably used. The aforementioned monovalent group may be substituted by other groups though they are not especially specified and preferable substitution groups include amino group, hydroxyl group, isocyanate group, halogen atoms such as fluorine atom, chlorine atom, bromine atom and so forth, and groups such as alkyl group, cycloalkyl group, alkenyl group, alyl group such as phenyl group and so forth, alkoxy group, alkenyloxy group, alyloxy group, acyl group, acyloxy group, alkoxycarbonyl group, alkaneamido group, alylamido group, alkylcarbamoyl group, alylcarbamoyl group, silyl group, alkylsilyl group, alkoxysilyl group, and so forth.

The aforementioned organic group with fluorine atoms or other groups represented by $R_1$–$R_6$ may be of the structure which contains a plurality of metallic atoms substituted by the group which is represented by $R^1R^2R^3M$-. (M represents the aforementioned metallic atom. $R^1$, $R^2$, and $R^3$ represent a monovalent group respectively. The aforementioned organic group with fluorine atoms or a group other than the aforementioned organic group with fluorine atoms which is represented by $R_1$–$R_6$ is given as a monovalent group.) Si and Ti as those metallic atoms are given and for example, silyl group, alkylsilyl group, alkoxysilyl group, and so forth can be given.

Groups with fluorine atoms represented by $R_1$–$R_6$ which are an alkyl group and an alkenyl group or an alkyl group and an alkenyl group based on an Alkoxy group and an alkenyloxy group which can be formed by those groups with fluorine atoms are preferable to be shown in general formula (F).

General formula (F)

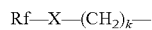

Rf in general formula (F) represents an alkyl group and an alkenyl group in which at least one hydrogen atom is substituted by fluorine atoms and for examples, those groups, mentioned below, are preferable. Perfluoroalkyl group and so forth such as trifluoromethyl group, pentafluoroethyl group, perfluorooctyl group, and heptafluoropropyl group, 3,3,3-trifluoropropyl group, and 4,4,3,3,2,2,1,1-octafluorobutyl group and alkenyl group substituted by fluorine atoms such as 1,1,1-trifluoro-2-chlorpropenyl group and so forth. Groups such as trifluoromethyl group, pentafluoroethyl group, perfluorooctyl group, heptafluoropropyl group and alkyl group possessing at least two or more fluorine atoms such as 3,3,3-trifluoropropyl group, 4,4,3,3,2,2,1,1octafluorobutyl group and so forth are especially preferable.

X is either a single bond or a divalent group. There are —O—, —S—, groups such as —NR—(R represents a hydrogen atom or an alkyl group.), and so forth and also groups of —CO—, —CO—O—, —CONH—, —SO$_2$NH—, —SO$_2$—O—, and —OCONH—, and so forth which represent divalent groups.

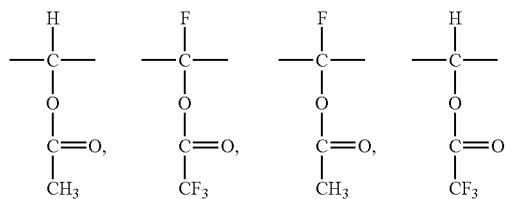

The symbol k is an integer of 0 to 50. But, an integer of 0 to 30 is preferably used.

Substitution groups other than fluorine atoms for Rf may be substituted and groups which are similar to those exemplified as substitution groups for the aforementioned $R_1$–$R_6$ can be given. Skeleton carbon atoms in Rf may be partially substituted by, for examples, groups of other atoms such as —O—, —S—, —NR$_0$— (R$_0$ represents a hydrogen atom or an alkyl group which is either substituted or not and may also be a group expressed in general formula (F).), carbonyl group, —NHCO—, —CO—O—, —SO$_2$NH—, and so forth.

Compounds which are hereinafter expressed in general formula (2) among those expressed by the aforementioned general formula (1) are preferable.

General formula (2)

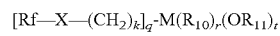

M in general formula (2) represents the same metallic atom as in the aforementioned general formula (1). Rf and X in the formula (2) represent the same groups as expressed in general formula (F) and the same integer represented by k is also applied. $R_{10}$ represents an alkyl group or an alkenyl group and also $R_{11}$ represents an alkyl group, an alkenyl group, or an alyl group. Preferably those groups represent an alkyl group and an alkenyl group which are not substituted though they may be substituted by the same groups as those provided as substitution groups of $R_1$–$R_6$ in the aforementioned general formula (1), and q+r+t=4, q≧1, and t≧1 are also satisfied respectively. A linkage ring of $R_{10}$ and $R_{10}$ may be formed in the case of r≧2.

Compounds which are expressed in general formula (3) described later among those expressed in general formula (2) are preferable.

General formula (3)

Rf, X, and k are used synonymously with those in the aforementioned general formula (2). $R_{12}$ is also used synonymously with $R_{11}$ in the general formula (2). M is also the same M as appeared in the formula (2). Si and Ti as M are preferably used. Especially Si is preferably used.

Compounds which are shown in general formula (4) described later are given as another preferable example of organometallic compounds possessing fluorine atoms in the present embodiment.

General Formula (4)

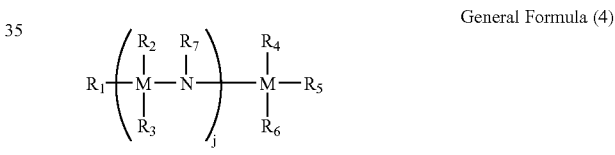

$R_1$–$R_6$ in general formula (4) are used synonymously with $R_1$–$R_6$ in the aforementioned general formula (1). At least one of $R_1$–$R_6$ is an organic group with fluorine atoms and a group expressed by the aforementioned general formula (F) is preferable. $R_7$ represents a hydrogen atom or an alkyl group which is either substituted or not. The symbol j represents an integer which can be 0 to 150 and an integer of 0 to 50 is preferably used. An integer of 0 to 20 is especially preferable.

Organometallic compounds possessing fluorine atoms which are expressed in general formula (5) described later are given as other preferable compounds possessing fluorine atoms which are employed in the present embodiment.

General formula (5)

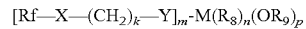

M represents In, Al, Sb, Y or La in the above general formula (5). Rf and X represent the same groups of Rf and X as appeared in the aforementioned general formula (F) and Y is either a single bond or an oxygen atom. The symbol k is similarly an integer of 0 to 50 and an integer not more than 30 is preferable. $R_9$ represents an alkyl group or an alkenyl group and also $R_8$ represents an alkyl group, an alkenyl group, or an alyl group. They may be substituted by the same groups as those provided as substitution groups of $R_1$–$R_6$ in the aforementioned general formula (1). In the above formula (5), the following conditions are shown. m+n+p=3 holds, and m is at least 1, n represents integers of 0–2 and p also represents integers of 0–2. The condition of m+p=3, namely of n=0 is preferable.

Organometallic compounds possessing fluorine atoms which are expressed in general formula (6) described later are provided as other preferable compounds possessing fluorine atoms which are employed in the present embodiment.

General formula (6)

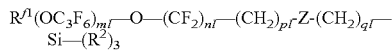

As for general formula (6), $R^{f1}$ represents a straight chain or a branched chain perfluoroalkyl group having a carbon number between 1 and 16, $R^2$ represents a hydrolysis group, and Z represents either —OCONH— or —O—. The symbol ml represents an integer between 1 and 50, nl represents an integer between 0 and 3, pl represents an integer between 0 and 3, ql represents an integer between 1 and 6, and $6 \geq nl+pl > 0$ holds.

A carbon number of a straight chain or a branched chain perfluoroalkyl group which can be introduced to $R^{f1}$ should be 1–16. The number 1–3 is especially preferable. Accordingly, —$CF_3$, —$C_2F_5$, —$C_3F_7$, and so forth as $R_{f1}$ are preferably used.

—Cl, —Br, —I, —$OR^{11}$, —$OCOR^{11}$, —$CO(R^{11})C$=C$(R^{12})_2$, —ON=$C(R^{11})_2$, —ON=$CR^{13}$, —$N(R^{12})_2$, —$R^{12}NOCR^{11}$, and so forth as hydrolysis groups which can be introduced to $R^2$ are preferably used. $R^{11}$ represents an aliphatic hydrocarbon group having a carbon number between 1 and 10 such as an alkyl group and so forth or an aromatic hydrocarbon group having a carbon number between 6 and 20 such as a phenyl group and so forth, $R^{12}$ represents an aliphatic hydrocarbon group having a carbon number between 1 and 5 such as a hydrogen atom or an alkyl group and so forth, and $R^{13}$ represents a divalent aliphatic hydrocarbon group having a carbon number between 3 and 6 such as an alkylidene group and so forth. —$OCH_3$, —$OC_2H_5$, —$OC_3H_7$, —$OCOCH_3$, and —$NH_2$ among those hydrolysis groups are preferably used.

The suffix ml in the aforementioned general formula (6) should be 1 to 30, and 5 to 20 in ml is more preferable. The suffix nl should be either 1 or 2, pl should also be either 1 or 2, and ql should be 1 to 3.

Organometallic compounds possessing fluorine atoms which are expressed in general formula (7) described later are given as other preferable compounds possessing fluorine atoms which are employed in the present embodiment.

General formula (7)

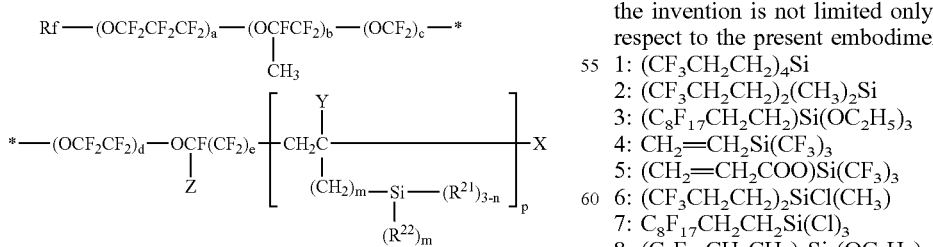

As for general formula (7), Rf represents a straight chain or a branched chain perfluoroalkyl group having a carbon number between 1 and 16, X represents an iodine atom or a hydrogen atom, Y represents a hydrogen atom or a lower alkyl group, Z represents a fluorine atom or a trifluoromethyl group, $R^{21}$ represents a hydrolyzable group, and $R^{22}$ represents a hydrogen atom or an inert and monovalent organic group. Suffixes a, b, c, and d are integers between 0 and 200 respectively, e is either 0 or 1, m and n are respectively integers between 0 and 2, and p is an integer between 1 and 10.

As for general formula (7), usually Rf represents a straight chain or a branched chain perfluoroalkyl group having a carbon number between 1 and 16. And those groups such as a $CF_3$ group, a $C_2F_5$ group, and a $C_3F_7$ group are preferable. A lower alkyl group possessing a carbon number between 1 and 5, represented by Y, can be given.

Halogen atoms such as a chlorine atom, a bromine atom, and an iodine atom, a $R^{23}O$ group, a $R^{23}COO$ group, a $(R^{24})_2C$=$C(R^{23})CO$ group, a $(R^{23})_2C$=NO group, a $R^{25}C$=NO group, a $(R^{24})_2N$ group, and a $R^{23}CONR^{24}$ group as hydrolyzable groups represented by $R^{21}$ should be used, where $R^{23}$ represents an aliphatic hydrocarbon group having a carbon number usually between 1 and 10 such as an alkyl group and so forth or an aromatic hydrocarbon group having a carbon number usually between 6 and 20 such as a phenyl group and so forth, $R^{24}$ represents a lower aliphatic hydrocarbon group having a carbon number usually between 1 and 5 such as a hydrogen atom, an alkyl group and so forth, and $R^{25}$ represents a divalent aliphatic hydrocarbon group having a carbon number usually between 3 and 6 such as an alkylidene group and so forth. A chlorine atom, a $CH_3O$ group, a $C_2H_5O$ group, and a $C_3H_7O$ group among those hydrolysis groups are preferably used.

$R^{22}$ represents a hydrogen atom or an inert, monovalent organic group and represents a monovalent hydrocarbon group having a carbon number usually between 1 and 4 such as an alkyl group and so forth preferably. Suffixes a, b, c, and d are integers between 0 and 200 respectively and those integers between 1 and 50 are preferable. m and n are integers between 0 and 2 and they should be 0 preferably. The symbol p represents integers of 1 or not less than 2, an integer between 1 and 10 is preferable, and an integer between 1 and 5 is especially preferable. The number-average molecular weight is $5 \times 10^2$–$1 \times 10^5$ and it is $1 \times 10^3$–$1 \times 10^4$ preferably.

A compound with a preferable structure as a silane compound expressed in the aforementioned general formula (7) is one where Rf is a $C_3F_7$ group, a is an integer between 1 and 50, b, c, and d are 0 respectively, e is 1, Z is a fluorine atom, and n is 0.

Organometallic compounds having organic groups with fluorine atoms used preferably as a silane compound possessing fluorine atoms and typical compounds among those compounds expessed in the aforementioned general formulae (1)–(7) in the present embodiment are given below. But, the invention is not limited only to those compounds with respect to the present embodiment.

1: $(CF_3CH_2CH_2)_4Si$
2: $(CF_3CH_2CH_2)_2(CH_3)_2Si$
3: $(C_8F_{17}CH_2CH_2)Si(OC_2H_5)_3$
4: $CH_2$=$CH_2Si(CF_3)_3$
5: $(CH_2$=$CH_2COO)Si(CF_3)_3$
6: $(CF_3CH_2CH_2)_2SiCl(CH_3)$
7: $C_8F_{17}CH_2CH_2Si(Cl)_3$
8: $(C_8F_{17}CH_2CH_2)_2Si(OC_2H_5)_2$
9: $CF_3CH_2CH_2Si(OCH_3)_3$
10: $CF_3CH_2CH_2SiCl_3$
11: $CF_3(CF_2)_3CH_2CH_2SiCl_3$
12: $CF_3(CF_2)_5CH_2CH_2SiCl_3$
13: $CF_3(CF_2)_5CH_2CH_2Si(OCH_3)_3$

14: $CF_3(CF_2)_7CH_2CH_2SiCl_3$
15: $CF_3(CF_2)_7CH_2CH_2Si(OCH_3)_3$
16: $CF_3(CF_2)_8CH_2Si(OC_2H_5)_3$
17: $CF_3(CH_2)_2Si(OC_2H_5)_3$
18: $CF_3(CH_2)_2Si(OC_3H_7)_3$
19: $CF_3(CH_2)_2Si(OC_4H_9)_3$
20: $CF_3(CF_2)_5(CH_2)_2Si(OC_2H_5)_3$
21: $CF_3(CF_2)_6(CH_2)_2Si(OC_3H_7)_3$
22: $CF_3(CF_2)_7(CH_2)_2Si(OC_2H_5)_3$
23: $CF_3(CF_2)_7(CH_2)_2Si(OC_3H_7)_3$
24: $CF_3(CF_2)_7(CH_2)_2Si(OCH_3)(OC_3H_7)_2$
25: $CF_3(CF_2)_7(CH_2)_2Si(OCH_3)^2OC_3H_7$
26: $CF_3(CF_2)_7(CH_2)_2SiCH_3(OCH_3)_2$
27: $CF_3(CF_2)_7(CH_2)_2SiCH_3(OC_2H_5)_2$
28: $CF_3(CF_2)_7(CH_2)_2SiCH_3(OC_3H_7)_2$
29: $(CF_3)_2CF(CF_2)_8(CH_2)_2Si(OCH_3)_3$
30: $C_7F_{15}CONH(CH_2)_3Si(OC_2H_5)_3$
31: $C_8F_{17}SO_2NH(CH_2)_3Si(OC_2H_5)_3$
32: $C_8F_{17}(CH_2)_2OCONH(CH_2)_3Si(OCH_3)_3$
33: $CF_3(CF_2)_7(CH_2)_2Si(CH_3)(OCH_3)_2$
34: $CF_3(CF_2)_7(CH_2)_2Si(CH_3)(OC_2H_5)_2$
35: $CF_3(CF_2)_7(CH_2)_2Si(CH_3)(OC_3H_7)_2$
36: $CF_3(CF_2)_7(CH_2)_2Si(C_2H_5)(OCH_3)_2$
37: $CF_3(CF_2)_7(CH_2)_2Si(C_2H_5)(OC_3H_7)_2$
38: $CF_3(CH_2)_2Si(CH_3)(OCH_3)_2$
39: $CF_3(CH_2)_2Si(CH_3)(OC_2H_5)_2$
40: $CF_3(CH_2)_2Si(CH_3)(OC_3H_7)_2$
41: $CF_3(CF_2)_5(CH_2)_2Si(CH_3)(OCH_3)_2$
42: $CF_3(CF_2)_5(CH_2)_2Si(CH_3)(OC_3H_7)_2$
43: $CF_3(CF_2)_2O(CF_2)_3(CH_2)_2Si(OC_3H_7)_3$
44: $C_7F_{15}CH_2O(CH_2)_3Si(OC_2H_5)_3$
45: $C_8F_{17}SO_2O(CH_2)_3Si(OC_2H_5)_3$
46: $C_8F_{17}(CH_2)_2OCHO(CH_2)_3Si(OCH_3)_3$
47: $CF_3(CF_2)_5CH(C_4H_9)CH_2Si(OCH_3)_3$
48: $CF_3(CF_2)_3CH(C_4H_9)CH_2Si(OCH_3)_3$
49: $(CF_3)_2(p-CH_3-C_6H_5)COCH_2CH_2CH_2Si(OCH_3)_3$
50: $CF_3CO-O-CH_2CH_2CH_2Si(OCH_3)_3$
51: $CF_3(CF_2)_3CH_2CH_2Si(CH_3)Cl$
52: $CF_3CH_2CH_2(CH_3)Si(OCH_3)_2$
53: $CF_3CO-O-Si(CH_3)_3$
54: $CF_3CH_2CH_2Si(CH_3)Cl_2$
55: $(CF_3)_2(p-CH_3-C_6H_5)COCH_2CH_2Si(OCH_3)_3$
56: $(CF_3)_2(p-CH_3-C_6H_5)COCH_2CH_2Si(OC_6H_5)_3$
57: $(CF_3C_2H_4)(CH_3)_2Si-O-Si(CH_3)_3$
58: $(CF_3C_2H_4)(CH_3)_2Si-O-Si(CF_3C_2H_4)(CH_3)_2$
59: $CF_3(OC_3F_6)_{24}-O-(CF_2)_2-CH_2-O-CH_2Si(OCH_3)_3$
60: $CF_3O(CF(CF_3)CF_2O)_mCF_2CONHC_3H_6Si(OC_2H_5)_3$ (m=11–30)
61: $(C_2H_5O)_3SiC_3H_6NHCOCF_2O(CF_2O)_n(CF_2CF_2O)_pCF_2CONHC_3H_6Si(OC_2H_5)_3$ (n/p=about 0.5, the number-average molecular weight=about 3000)
62: $C_3F_7-(OCF_2CF_2CF_2)_q-O-(CF_2)_2-[CH_2CH\{Si-(OCH_3)_3\}]_9-H$ (q=about 10)
63: $F(CF(CF_3)CF_2O)_{15}CF(CF_3)CONHCH_2CH_2CH_2Si(OC_2H_5)_3$
64: $F(CF_2)_4[CH_2CH(Si(OCH_3)_3)_3]_{2.02}OCH_3$
65: $(C_2H_5O)_3SiC_3H_6NHCO-[CF_2(OC_2F_4)_{10}(OCF_2)_6OCF_2]CONHC_3H_6Si(OC_2H_5)_3$
66: $C_3F_7(OC_3F_6)_{24}O(CF_2)_2CH_2OCH_2Si(OCH_3)_3$
67: $CF_3(CF_2)_3(C_6H_4)C_2H_4Si(OCH_3)_3$
68: $(CF_3)_2CF(CF_2)_6CH_2CH_2SiCH_3(OCH_3)_2$
69: $CF_3(CF_2)_3(C_6H_4)C_2H_4SiCH_3(OCH_3)_2$
70: $CF_3(CF_2)_5(C_6H_4)C_2H_4Si(OC_2H_5)_3$
71: $CF_3(CF_2)_2C_2H_4Si(NCO)_3$
72: $CF_3(CF_2)_3C_2H_4Si(NCO)_3$
73: $C_9F_{19}CONH(CH_2)_3Si(OC_2H_5)_3$
74: $C_9F_{19}CONH(CH_2)_3SiCl_3$
75: $C_9F_{19}CONH(CH_2)_3Si(OC_2H_5)_3$
76: $C_3F_7O(CF(CF_3)CF_2O)_2-CF(CF_3)-CONH(CH_2)Si(OC_2H_5)_3$
77: $CF_3O(CF(CF_3)CF_2O)_6CF_2CONH(CH_2)_3SiOSi(OC_2H_5)_2(CH_2)_3NHCOCF_2(OCF_2CF(CF_3))_6OCF_3$
78: $C_3F_7COOCH_2Si(CH_3)_2OSi(CH_3)_2CH_2OCOC_3F_7$
79: $CF_3(CF_2)_7CH_2CH_2O(CH_2)_3Si(CH_3)_2OSi(CH_3)_2(CH_2)_3OCH_2CH_2(CF_2)_7CF_3$
80: $CF_3(CF_2)_5CH_2CH_2O(CH_2)_2Si(CH_3)_2OSi(CH_3)_2(OC_2H_5)$
81: $CF_3(CF_2)_5CH_2CH_2O(CH_2)_2Si(CH_3)_2OSi(CH_3)(OC_2H_5)_2$
82: $CF_3(CF_2)_5CH_2CH_2O(CH_2)_2Si(CH_3)_2OSi(CH_3)_2Osi(CH_3)_2(OC_2H_5)$ Compounds other than those shown above as alkoxysilane substituted by fluorine atoms are given.
83: (perfluoropropyloxy)dimethylsilane
84: tris(perfluoropropyloxy)methylsilane
85: dimethylbis(nonafluorobutoxy)silane
86: methyltris(nonafluorobutoxy)silane
87: bis(perfluoropropyloxy)diphenylsilane
88: bis(perfluoropropyloxy)methylvinylsilane
89: bis(1,1,1,3,3,4,4,4-octafluorobutoxy) dimethylsilane
90: bis(1,1,1,3,3,3-hexafluoroisopropoxy) dimethylsilane
91: tris(1,1,1,3,3,3-hexafluoroisopropoxy) methylsilane
92: tetrakis(1,1,1,3,3,3-hexafluoroisopropoxy)silane
93: dimethylbis(nonafluoro-t-butoxy)silane
94: bis(1,1,1,3,3,3-hexafluoroisopropoxy) diphenylsilane
95: tetrakis(1,1,3,3-tetrafluoroisopropoxy)silane
96: bis[1,1-bis(trifluoromethyl)ethoxy]dimethylsilane
97: bis(1,1,1,3,3,4,4,4-octafluoro-2-butoxy) dimethylsilane
98: methyltris[2,2,3,3,3-pentafluoro-1,1-bis (trifluoromethyl)propoxy]silane
99: diphenylbis[2,2,2-trifluoro-1-(trifluoromethyl)-1-tolylethoxy]silane Other compounds are given below.
100: $(CF_3CH_2)_3Si(CH_2-NH_2)$
101: $(CF_3CH_2)_3Si-N(CH_3)_2$ 102: $(CF_3CH_2)_3Si-CH_2CH_2-N\langle\text{piperidine}\rangle$ 103: $(CF_3CH_2)_2Si-(NH-C_6H_5)_2$ 104: $CF_3CH_2CH_2-\overset{H}{\underset{CH_3}{Si}}-N-\overset{H}{\underset{CH_3}{Si}}-CH_3$ 105: $CF_3CH_2CH_2-\overset{CH_3}{\underset{CH_3}{Si}}-\overset{H}{N}-\overset{CH_3}{\underset{CH_3}{Si}}-CH_3$ Such a silazane. Organotitanium compounds possessing fluorine atoms are given here.
106: $CF_3CH_2-CH_2TiCl_3$
107: $CF_3(CF_2)_3CH_2CH_2TiCl3$
108: $CF_3(CF_2)_5CH_2CH_2Ti(OCH_3)_3$
109: $CF_3(CF_2)_7CH_2CH_2TiCl_3$ 110: Ti(OC$_3$F$_7$)$_4$
111: (CF$_3$CH$_2$—CH$_2$O)$_3$TiCl$_3$
112: (CF$_3$C$_2$H$_4$)(CH$_3$)$_2$Ti—O—Ti (CH$_3$)$_3$ Samples of organometallic compounds possessing fluorine atoms can be given below.

113: CF$_3$(CF$_2$)$_3$CH$_2$CH$_2$O(CH$_2$)$_3$GeCl
114: CF$_3$(CF$_2$)$_3$CH$_2$CH$_2$OCH$_2$Ge(OCH$_3$)$_3$
115: (C$_3$F$_7$O)$_2$Ge(OCH$_3$)$_2$
116: [(CF$_3$)$_2$CHO]$_4$Ge
117: [(CF$_3$)$_2$CHO]$_4$Zr
118: (C$_3$F$_7$CH$_2$CH$_2$)$_2$Sn(OC$_2$H$_5$)$_2$
119: (C$_3$F$_7$CH$_2$CH$_2$)Sn(OC$_2$H$_5$)$_3$
120: Sn(OC$_3$F$_7$)$_4$
121: CF$_3$CH$_2$CH$_2$In(OCH$_3$)$_2$
122: In(OCH$_2$CH$_2$OC$_3$F$_7$)$_3$
123: Al(OCH$_2$CH$_2$OC$_3$F$_7$)$_3$
124: Al(OC$_3$F$_7$)$_3$
125: Sb(OC$_3$F$_7$)$_3$
126: Fe(OC$_3$F$_7$)$_3$
127: Cu(OCH$_2$CH$_2$OC$_3$F$_7$)$_2$
128: C$_3$F$_7$(OC$_3$F$_6$)$_{24}$O(CF$_2$)$_2$CH$_2$OCH$_2$Si (OCH$_3$)$_3$

129

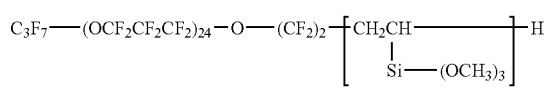

Each compound given by those actual examples has been put on the market by Dow Corning Toray Silicone Co., Ltd, Shin-Etsu Chemical Co., Ltd, Daikin Industries, Ltd (OP-TOOL DSX, for example), and Gelest Inc., and so forth and those compounds can be easily purchased. Those compounds can be manufactured by the synthesis method described in J. Fluorine Chem., 79(1),87(1996), Zairyou Gijutsu, 16(5),209(1998), Collect. Czech. Chem. Commun., vol. 44,750–755, J. Amer. Chem. Soc. vol. 112,2341–2348 (1990), Inorg. Chem., vol. 10,889–892(1971), U.S. Pat. No. 3,668,233, TOKKAISHO No. 58-122979, TOKKAIHEI No. 7-242675, TOKKAIHEI No. 9-61605, TOKKAIHEI No. 11-29585, TOKKAI No. 2000-64348, TOKKAI No. 2000-144097, and so forth, for examples. Or, those compounds can be manufactured by synthesis techniques based on this method.

The manufacturing method of front plane 1 will be explained next. First, hard coat film 5 composed of an inorganic hard coat agent, an organic hard coat agent, and an organic-inorganic hybrid coat agent is formed on the base material 4 by using a known coating technique.

Anti-reflection film 6 is formed on hard coat film 5 by using atmospheric pressure plasma discharge treatment equipment 10, after hard coat film 5 is formed on the base material 4. How to form anti-reflection film 6 on the base material 4 and the operation of atmospheric pressure plasma discharge treatment equipment 10 will be explained in detail. First, the base material 4 with hard coat film 5 is set up and fixed on stage electrode 11 and then, the reciprocating motion of stage electrode 11 in a direction from side to side as shown in FIG. 2 is made. In synchronization with this, gas G is supplied into discharge space 16 between stage electrode 11 and each rectangular cylinder-shaped electrode 13 from each gas supply port 14 under the atmospheric pressure or the pressure close to it, and the second high frequency electric field in frequency ω2, electric field intensity V2, and current I2 is applied at discharge space 16 from the second power source 18 after the first high frequency electric field in frequency ω1, electric field intensity V1, and current I1 is applied at discharge space 16 from the first power source 17.

A manufacturing method of lenticular lens 2 is explained here. In the case of forming anti-reflection film 6 on the base material 4, anti-reflection film 6 is formed on the base material 4 by using atmospheric pressure plasma discharge treatment equipment 10. How to form anti-reflection film 6 on the base material 4 and the operation of atmospheric pressure plasma discharge treatment equipment 10 will be explained in detail. First, the base material 4 is set up and fixed on stage electrode 11 and then, the reciprocating motion of stage electrode 11 in a direction from side to side as shown in FIG. 2 is made. In synchronization with this, gas G is supplied into discharge space 16 between stage electrode 11 and each rectangular cylinder-shaped electrode 13 from each gas supply port 14 under the atmospheric pressure or the pressure close to it, and the second high frequency electric field in frequency ω2, electric field intensity V2, and current I2 is applied at discharge space 16 from the second power source 18 after the first high frequency electric field in frequency ω1, electric field intensity V1, and current I1 is applied at discharge space 16 from the first power source 17.

A manufacturing method of fresnel lens 3 is explained here.

In the case of forming anti-reflection film 6 on the base material 4, anti-reflection film 6 is formed on the base material 4 by using atmospheric pressure plasma discharge treatment equipment 10. How to form anti-reflection film 6 on the base material 4 and the operation of atmospheric pressure plasma discharge treatment equipment 10 will be explained in detail. First, the base material 4 is set up and fixed on stage electrode 11 and then, the reciprocating motion of stage electrode 11 in a direction from side to side as shown in FIG. 2 is made. In synchronization with this, gas G is supplied into discharge space 16 between stage electrode 11 and each rectangular cylinder-shaped electrode 13 from each gas supply port 14 under the atmospheric pressure or the pressure close to it, and the second high frequency electric field in frequency ω2, electric field intensity V2, and current I2 is applied at discharge space 16 from the second power source 18 after the first high frequency electric field in frequency ω1, electric field intensity V1, and current I1 is applied at discharge space 16 from the first power source 17.

At this time, the first high frequency electric field and the second high frequency electric field are superposed each other. A high frequency electric field is applied at discharge space 16 from the first power source 17 and the second power source 18 respectively in such a way that frequency ω2 of the second high frequency electric field is higher than frequency ω1 of the first high frequency electric field, the relation among the first high frequency electric field intensity V1, the second high frequency electric field intensity V2, and the electric field intensity at start of discharge IV satisfies V1≧IV>V2 or V1>IV≧V2, and the power density of the second high frequency electric field is 1 W/cm$^2$ or more.

Under this condition, gas G which is supplied to discharge space 16 is activated, the base material 4 situated on stage electrode 11 is exposed to the activated gas G, and a thin film is deposited onto hard coat film 5 prepared on the base material 4.

It is designed that thin films are formed on the base material 4 by the above operation of atmospheric pressure plasma discharge treatment equipment 10. It is also designed that a single layer of anti-reflection film 6 having a desired refractive index is formed or plural-layer-laminated anti-reflection film 6 having different refractive indices respectively is formed by appropriately changing materials of the first gas for thin film formation.

Titanium compounds as the first gas for thin film formation to prepare a high refractive index layer can be preferably used though the first gas for thin film formation is not limited as long as appropriate refractive indices can be obtained with compounds, and silicon compounds, fluorine compounds, or a mixture of a silicon compound and a fluorine compound as the second gas for thin film formation can be preferably used in order to form a low refractive index layer. A mixture of two unlike gases or more as the first gas for thin film formation to prepare any layer may be used in order to adjust refractive indices of those compounds.

Titanium compounds used for the first gas for thin film formation to prepare a high refractive index layer are organotitanium compound, titanium hydrogen compound, halogenated titanium, and so forth. There are as organotitanium compounds, for example, triethoxytitanium, trimethoxytitanium, triisopropoxytitanium, tributoxytitanium, tetraethoxytitanium, tetraisopropoxytitanium, methyldimethoxytitanium, ethyltriethoxytitanium, methyltriisopropoxytitanium, triethyltitanium, triisopropyltitanium, tributyltitanium, tetraethyltitanium, tetraisopropyltitanium, tetrabutyltitanium, tetradimethylaminotitanium, dimethyltitaniumdi(2,4-pentanedionate), ethyltitaniumtri(2,4-pentanedionate), titaniumtris(2,4-pentanedionate), titaniumtris(acetomethylacetate), triacetoxytitanium, dipropoxypropionyloxytitanium and the like, and dibutyryloxytitanium. There are monotitanium hydrogen compound, dititanium hydrogen compound, and so forth as titanium hydrogen compounds. There are trichlorotitanium, tetrachlorotitanium, and so forth as halogenated titanium. A simultaneous mixture of two unlike gases or more among those first gases for thin film formation can be used.

Silicon compounds used for the first gas for thin film formation to prepare a low refractive index layer are organosilicon compound, silicon hydrogen compound, halogenated silicon compound, and so forth. There are as organosilicon compounds, for example, tetraethylsilane, tetramethylsilane, tetraisopropylsilane, tetrabutylsilane, tetraethoxysilane, tetraisopropoxysilane, tetrabutoxysilane, dimethyldimethoxysilane, diethyldiethoxysilane, diethylsilanedi(2,4-pentanedionate), methyltrimethoxysilane, methyltriethoxysilane, ethyltriethoxysilane, and so forth. There are silanetetrahydride, disilanehexahidride, and so forth as silicon hydrogen compounds. There are tetrachlorosilane, mthyltrichlorosilane, diethyldichlorosilane, and so forth as halogenated silicon compounds. The aforementioned fluorine compounds can also be used. Two unlike gases or more among those first gases for thin film formation can be mixed simultaneously to be used. Two unlike gases or more among tin compound, titanium compound, and silicon compound may be mixed simultaneously and appropriately to be used for fine adjustment of a refractive index.

Metallic hydrogen compounds and alkoxy metals in organotitanium compounds or organosilicon compounds mentioned above are preferable from the aspect of handling, and alkoxy metals are preferably used because of no generation of corrosion and poison gas as well as of less contamination produced in the process. Any state of gas, liquid, and solid at room temperature and atmospheric pressure for both compounds can be accepted when an organotin compound, an organotitanium compound, or an organosilicon compound is introduced into discharge space 16 (between stage electrode 11 and each rectangular cylinder-shaped electrode 13). In the case of gas, the gas is introduced into discharge space 16 as it is. But, in the case of liquid and solid, they are vaporized by means of heating, reduced pressure, and emission of ultrasonic waves and can be used. When an organotin compound, an organotitanium compound, or an organosilicon compound is vaporized by heating to be used, metallic alkoxide such as tetraethoxy metal, tetraisopropoxy metal, and so forth which are in the state of liquid at room temperature with a boiling point of not more than 200° C. is preferably used for thin film formation. The alkoxy metal mentioned above may be diluted by solvent to be used. In this case, it is vaporized by a vaporizer and the like into inert gas in order to produce a mixture gas which may be used. There are organic solvents such as methanol, ethanol, isopropanol, butanol, n-hexane, and so forth and a mixture of those solvents which can be used as solvents.

From the aspect of forming uniform thin film on the base material 4 by a discharge plasma treatment with respect to the first gas for thin film formation, the content of the first gas for thin film formation in the total gas G should be 0.01–10 vol % and should more preferably be 0.01–1 vol %.

After anti-reflection film 6 is prepared on one surface of the base material 4 by using atmospheric pressure plasma discharge treatment equipment 10, lenticular lens 2 or fresnel lens 3 is manufactured through the same repetitive operation by preparing anti-reflection film 6 on the other surface of the base material 4. However, a manufacturing method of anti-reflection film 6 with atmospheric pressure plasma discharge treatment equipment 10 may be applied only to the surface on one side of the base material 4 to prepare anti-reflection film 6 only on a single surface of the base material 4.

Antifouling film 7 is formed on anti-reflection film 6 by using atmospheric pressure plasma discharge treatment equipment for antifouling film formation 40 after the anti-reflection film 6 is deposited on the base material 4. How to form antifouling film 7 on the base material 4 and the operations of atmospheric pressure plasma discharge treatment equipment for antifouling film formation 40 will be explained in detail. Under the atmospheric pressure or the pressure close to it, the second discharge gas G2 is initially introduced into two discharge spaces between plane electrodes 41–42 and between plane electrodes 43–44 respectively, and a high frequency voltage generated by high frequency power source 45 is impressed between plane electrodes 41–42 and between plane electrodes 43–44 respectively, so that the second discharge gas G2 staying in each of those discharge spaces may be activated. At this time, discharge does not occur between plane electrode 42–43. The second discharge gas G2 activated in those discharge spaces is pushed by the second discharge gas G2 which is newly introduced into discharge space to be ejected out of the discharge space to discharge space outside 49.

In synchronization with this, the second gas for thin film formation M2 is introduced between plane electrode 42 and 43. As in the case of the second discharge gas G2, the second gas for thin film formation M2 is pushed by the second gas for thin film formation M2 which is newly introduced, to be forced to pass through plane electrodes 42–43, and is ejected out to outside of discharge space 49.

An indirect activated gas is generated by a mutual contact between the second activated discharge gas G2 and the second gas for thin film formation M2 in outside of discharge spaces 49.

Under this condition, handler belt 48 is operated so that the base material 4 may pass through outside of discharge space 49 to be exposed to outside of discharge spaces 49 where the indirect activated gas is present. Through this, antifouling film 7 is formed on the surface of the base material 4 and front plane 1 is manufactured.

In the present invention, because of anti-reflection film 6 formed on the base material 4 which is exposed to gas G activated under the particular discharge condition with atmospheric pressure plasma discharge treatment equipment 10, front plane 1 is free from the problem that thickness uniformity of anti-reflection film 6 can not be obtained because of non-uniformity in the coated film, an adhesion between anti-reflection film 6 and the base material 4 is inferior, and so forth, which is different from the case where anti-reflection film 6 is prepared on the base material 4 by a coating technique and an evaporation technique, and thickness in anti-reflection film 6 is uniform and an adhesion between anti-reflection film 6 and the base material 4 is excellent. In addition, front plane 1 is excellent in antifouling function like water-repelling because antifouling film 7 is formed on anti-reflection film 6 of the base material 4 by atmospheric pressure plasma discharge treatment equipment for antifouling film formation 40.

In the present invention, because of anti-reflection film 6 formed on the base material 4 which is exposed to gas G activated under the particular discharge condition with atmospheric pressure plasma discharge treatment equipment 10, lenticular lens 2 or fresnel lens 3 is free from the problem that thickness uniformity of anti-reflection film 6 can not be obtained because of non-uniformity in the coated film, which is different from the case where anti-reflection film 6 is prepared on the base material 4 by a coating technique, and a sophisticated anti-reflection function with a high total light transmittance can be added.

Hard coat film 5, anti-reflection film 6, and antifouling film 7 are deposited only on one side of the base material 4 in manufacturing front plane 1 of the above embodiment. But, hard coat film 5, anti-reflection film 6, and antifouling film 7 may also be deposited on the other side of the base material 4 by the same manufacturing method mentioned above. Anti-reflection film 6 may be directly deposited on the base material 4 without deposition of hard coat film 5 though hard coat film 5 was coated on the base material 4 of front plane 1 by a coating technique.

Anti-reflection film 6 may be formed on the base material 4 by jet technique atmospheric pressure plasma discharge treatment equipment 30 shown in FIG. 7 in place of atmospheric pressure plasma discharge treatment equipment 10 as shown in FIG. 2 though anti-reflection film 6 is formed on the base material 4 by atmospheric pressure plasma discharge treatment equipment 10 in FIG. 2 in the above embodiment.

Jet technique atmospheric pressure plasma discharge treatment equipment 30 will be explained here, referring to FIG. 7. A detailed explanation on those constituent parts is omitted in jet technique atmospheric pressure plasma discharge treatment equipment 30 explained below by using the same symbols as in atmospheric pressure plasma discharge treatment equipment 10 for those constituent parts in atmospheric pressure plasma discharge treatment equipment 10 which have already been explained.

As shown in FIG. 7, two rectangular cylinder-shaped electrodes 13 which are facing each other at a specified spacing are placed in jet technique atmospheric pressure plasma discharge treatment equipment 30. One rectangular cylinder-shaped electrode 13 (the first electrode) is connected to the first power source 17 and the other rectangular cylinder-shaped electrode 13 (the second electrode) is connected to the second power source 18.

The first filter 19 is placed between rectangular cylinder-shaped electrode 13 on one side mentioned above and the first power source 17. The first filter 19 is designed so that the current passing through one rectangular cylinder-shaped electrode 13 mentioned above from the first power source 17 runs easily and the current passing through the first power source 17 from the second power source 18 does not run easily with grounding the current running through from the second power source 18.

The second filter 20 is placed between rectangular cylinder-shaped electrode 13 on the other side and the second power source 18. The second filter 20 is designed so that the current passing through the other rectangular cylinder-shaped electrode 13 mentioned above from the second power source 18 runs easily and the current passing through the second power source 18 from the first power source 17 does not run easily with grounding the current running through from the first power source 17.

High frequency electric field intensity V1, V2 (applied electric field intensity) and electric field intensity at start of discharge can be measured if high frequency voltage probes 31–32 and oscilloscopes 33–34 are installed in jet technique atmospheric pressure plasma discharge treatment equipment 30 as shown in FIG. 6.

In the case of a thin film formed on the base material 4 by jet technique atmospheric pressure plasma discharge treatment equipment 30 provided with such a configuration, gas G is introduced into discharge space 35 between each rectangular cylinder-shaped electrodes 13 from a gas supply port (illustration omitted), discharge is generated by a high frequency electric field applied from each rectangular cylinder-shaped electrode 13, and gas G is jet-sprayed in the direction of a lower portion of each rectangular cylinder-shaped electrode 13 in generating plasma as shown in FIG. 7. And the treatment space between the lower portion of each rectangular cylinder-shaped electrode 13 and the base material 4 is filled up with gas G° in the state of plasma, the base material 4 is exposed to gas G° in the state of plasma around the treatment position 36, and a thin film is formed on the base material 4. In this case also, with the same condition as above, a single layer of anti-reflection film 6 having a desired refractive index is formed or a plural of layers of laminated anti-reflection film 6 having different diffractive indices respectively in an appropriate change of materials of the first gas for film formation are formed.

Each rectangular cylinder-shaped electrode 13 is heated up or cooled down in the course of forming the thin film by a medium running through pipelines from an electrode temperature adjustment means (illustration omitted). At the time of a plasma discharge treatment, the temperature control on the base material 4 should be made as properties, compositions, and so forth of thin films produced may vary depending on a temperature change on the base material 4. Insulating materials such as oil, distilled water, and so forth as media for temperature adjustment are preferably used. At the time of a plasma discharge treatment, temperature inside each rectangular cylinder-shaped electrode 13 should be evenly adjusted so as to prevent a temperature variation on the base material 4 as much as possible in a longitudinal direction or in a width direction.

Anti-reflection film 6 may be formed by jet-spraying the mutually different, second gas for thin film formation from jet technique atmospheric pressure plasma discharge treatment equipment 30 after a plurality of the plasma discharge treatment equipments 30 are arranged in series.

In the case of lenticular lens 2 and fresnel lens 3, anti-reflection film 6 having an anti-reflection film formed with 4 alternate layers composed of a high refractive index layer and a low refractive index layer may be formed by jet-spraying the mutually different gas for thin film formation from jet technique atmospheric pressure plasma discharge treatment equipment 30 after a plurality of the plasma discharge treatment equipments 30 are arranged in series.

EXAMPLE 1

Front Plane

[Manufacture of Electrode]

A stage electrode and a rectangular cylinder-shaped electrode were manufactured as follows. Those stage electrode and rectangular cylinder-shaped electrode made of titanium alloy T64 with hollow jackets were manufactured as described below. A high dense and high adhesive alumina thermal spray film was coated on the surfaces facing mutually between a stage electrode and a rectangular cylinder-shaped electrode by the atmospheric pressure plasma method. After coating thereafter the solution which is tetramethoxysilane diluted by ethylacetate and then drying, a curing operation with ultraviolet irradiation and a sealing treatment took place. Coated dielectric surfaces were polished and smoothed and they were processed so that Rmax may come to 5 µm. The percentage of porosity of the final dielectric was 5 vol %. $SiO_x$ content in dielectric layers at this time was 75 mol %. Thickness of the final dielectric and relative permittivity of the dielectric were 1 mm (within ±1% in thickness variation) and 10 respectively. And difference in coefficient of linear thermal expansion between the conductive, metallic base material and the dielectric was $1.6 \times 10^{-6}/°C$. And also heat-resistant temperature was 250° C.

[Atmospheric Pressure Plasma Discharge Equipment]

By using an atmospheric pressure plasma discharge equipment shown in FIG. 2, a stage electrode which was manufactured in the above explanation and a rectangular cylinder-shaped electrode were arranged to face each other in parallel with some spacing in such a way that a distance between the rectangular cylinder-shaped electrode and the base material becomes 1 mm, and the first electric field and the second electric field, which are shown in Table 1, were placed. Power source A5 was used at 100 kHz in continuous mode (which is the same also in examples described below). In the case of Sample No. 16, a direct current pulsed power source was used for the first electric field and the repetition frequency of ON/OFF was set up to be 10 kHz. Both electrodes were kept warm at 65° C. by adjusting. Each filter to which current does not flow back from the stage electrode and the rectangular cylinder-shaped electrode was installed.

[Manufacture of Titanium Oxide Thin Film]

Electric fields as shown in Table 1 were applied between a stage electrode and a rectangular each cylinder-shaped electrode by using a mixed gas composed of the composition shown below, a thin film was formed by discharging on a commercially available PMMA (polymethyl methacrylate) plate with 2 mm in thickness on which a hard coat film is formed, and samples 1–16 were prepared. In addition, the electric field intensity at start of discharge was 4.5 kV/mm.

<Composition of Mixed Gas>

| | | |
|---|---|---|
| The first discharge gas | Nitrogen | 97.9 vol % |
| The first gas for thin film formation | tetraisopropoxytitanium | 0.1 vol % |
| Addition gas | Hydrogen | 2.0 vol % |

[Evaluation]

<State of Discharge>

States of discharge between facing electrodes (between a stage electrode and a rectangular cylinder-shaped electrode) were graded as shown below.

A: Discharge is generated, and it is stable.

B: Discharge is generated, but it is rather unstable

C: No discharge is entirely generated.

<Refractive Index>

Reflection spectrums on those samples 1–16 were measured under the condition of regular reflection 5 times by spectrophotometer Type U-4000 (Hitachi, Ltd). After a surface-roughing treatment was done for the surface on the side of the base material on which a thin film is not formed by an atmospheric pressure plasma discharge treatment equipment, an optical absorption treatment was done by using a black color spray and reflection spectrums with 400–700 nm in wavelength were measured by preventing the reflection of light on the rear surface of the base material. And then, thickness of the film was optically calculated by the value of λ/4 in spectrum and the refractive index based on this calculation was determined. In addition, a low refractive index means a large porosity appeared in layers because of a lack of density in the structure of layers and those phenomena through which air is penetrated into pores at the time of measurements and particles originated in a discharge space are also absorbed in the films result in defective films.

Results were given in Table 1 after states of discharge were observed and refractive indices were also measured.

TABLE 1

| | The first electric field | | | | The second electric field | | | | Evaluation result | | |
|---|---|---|---|---|---|---|---|---|---|---|---|
| Sample No. | Power source type | Frequency $\omega 1$ (Hz) | Electric field intensity V1 (kV/mm) | Power density (W/cm²) | Power source type | Frequency $\omega 2$ (Hz) | Electric field intensity V2 (kV/mm) | Power density (W/cm²) | State of discharge | Refractive index | Remark |
| 1 | A2 | 5k | 12 | 1 | B1 | 800k | 1.2 | 10 | A | 2.28 | Inv. |
| 2 | A2 | 5k | 12 | 1 | B2 | 2M | 1.0 | 10 | A | 2.33 | Inv. |

TABLE 1-continued

| | | The first electric field | | | | The second electric field | | | Evaluation result | | |
|---|---|---|---|---|---|---|---|---|---|---|---|
| Sample No. | Power source type | Frequency ω1 (Hz) | Electric field intensity V1 (kV/mm) | Power density (W/cm$^2$) | Power source type | Frequency ω2 (Hz) | Electric field intensity V2 (kV/mm) | Power density (W/cm$^2$) | State of discharge | Refractive index | Remark |
| 3 | A2 | 5k | 12 | 1 | B3 | 13.56M | 0.8 | 10 | A | 2.32 | Inv. |
| 4 | A2 | 5k | 12 | 1 | B4 | 27M | 0.5 | 10 | A | 2.31 | Inv. |
| 5 | A2 | 5k | 12 | 1 | B5 | 150M | 0.2 | 10 | A | 2.25 | Inv. |
| 6 | A5 | 100k | 8 | 1 | B3 | 13.56M | 0.8 | 10 | A | 2.42 | Inv. |
| 7 | A5 | 100k | 8 | 1 | B3 | 13.56M | 0.2 | 1.0 | A | 2.20 | Inv. |
| 8 | A5 | 100k | 8 | 1 | B3 | 13.56M | 0.23 | 1.2 | A | 2.22 | Inv. |
| 9 | A5 | 100k | 8 | 1 | B4 | 27M | 0.8 | 20 | A | 2.40 | Inv. |
| 10 | A5 | 100k | 8 | 1 | B5 | 150M | 0.5 | 50 | A | 2.35 | Inv. |
| 11 | A5 | 100k | 8 | 1 | B3 | 13.56M | 0.15 | 0.8 | B | 1.85 | Comp. |
| 12 | A4 | 50k | 3.7 | 0.5 | A5 | 100k | 3.7 | 0.5 | B | C (Powder appeared) | Comp. |
| 13 | A2 | 5k | 12 | 1 | A5 | 100k | 8.0 | 1.0 | B | C (Powder appeared) | Comp. |
| 14 | A3 | 15k | 3 | 0.1 | B1 | 800k | 2.0 | 0.1 | C | No thin film formed | Comp. |
| 15 | B3 | 13.56M | 0.8 | 0.2 | B3 | 13.56M | 0.8 | 0.2 | C | No thin film formed | Comp. |
| 16 | — | DC pulse | 12 | 1 | B3 | 13.56M | 0.8 | 10 | B | 1.78 | Comp. |

Inv.: The present invention
Comp.: Comparative example (Result)

As for Samples No. 1–No. 10 relating to the present invention in the relation between frequencies. (ω1, ω2) in the first and the second high frequency electric fields applied from the first and the second electrodes, in the relation between the first and the second high frequency electric field intensities (V1, V2) and the electric field intensity at start of discharge for the first discharge gas, and in the power density of the second high frequency electric field, dense thin films (which can be determined through the value of refractive index) were prepared under the good discharge condition. On the contrary, for Samples No. 11–No. 16 having nothing to do with the present invention, no dense thin film with porosity (low refractive index) was formed because of inability to form thin films even though discharge is in good condition, or no film was formed entirely because of no generation of discharge.

EXAMPLE 2

Front Plane

All were the same items as in Example 1 except for the changes to the first and the second high frequency electric fields shown in Table 2 and the installation of the first and the second filters and Samples No. 17–No. 23 were prepared.

Samples No. 17–No. 23 were evaluated as described above and results were shown in Table 2.

TABLE 2

| | | The first electric field | | | | | The second electric field | | | | Evaluation result | | |
|---|---|---|---|---|---|---|---|---|---|---|---|---|---|
| Sample No. | Power source type | Frequency ω1 (Hz) | Electric field intensity V1 (kV/mm) | Power density (W/cm$^2$) | The first filter usage | Power source type | Frequency ω2 (Hz) | Electric field intensity V2 (kV/mm) | Power density (W/cm$^2$) | The second filter usage | State of discharge | Refractive index | Remark |
| 17 | A2 | 5k | 12 | 1 | Condenser 1 | B3 | 13.56M | 0.8 | 10 | Coil 1 | A | 2.33 | Inv. |
| 18 | A5 | 100k | 8 | 1 | Condenser 1 | B3 | 13.56M | 0.8 | 10 | Coil 1 | A | 2.32 | Inv. |
| 19 | A2 | 5k | 12 | 1 | Coil 1 | B1 | 800k | 1.2 | 10 | Coil 1 | A | 2.22 | Inv. |
| 20 | A5 | 100k | 8 | 1 | Coil 1 | B1 | 800k | 1.2 | 10 | Coil 1 | A | 2.28 | Inv. |
| 21 | B1 | 800k | 1.2 | 1 | Coil 2 | B1 | 800k | 1.2 | 10 | Coil 2 | C | *1 | Comp. |
| 22 | B3 | 13.56M | 0.8 | 1 | Not in use | | Not in use | | | Not in use | C | *1 | Comp. |

TABLE 2-continued

| | | The first electric field | | | | | The second electric field | | | | Evaluation result | | |
|---|---|---|---|---|---|---|---|---|---|---|---|---|---|
| Sample No. | Power source type | Frequency ω1 (Hz) | Electric field intensity V1 (kV/mm) | Power density (W/cm²) | The first filter usage | Power source type | Frequency ω2 (Hz) | Electric field intensity V2 (kV/mm) | Power density (W/cm²) | The second filter usage | State of discharge | Refractive index | Remark |
| 23 | A4 | 50k | 10 | 1 | Not in use | Not in use | | | | Not in use | A | 1.63 | Comp. |

Condenser: 100 pF
Coil 1: 1 μH
Coil 2: 10 μH
*1: No thin film formed
Inv.: The present invention
Comp.: Comparative example (Result)

With a normal discharge generated, thin films for Samples No. 17–No. 20 were formed normally by using an atmospheric pressure plasma discharge treatment equipment and installing filters as shown in Table 2. On the contrary, a thin film for Sample No. 21 could not be formed with no discharge generated because a combination of filters installed was not adjusted to frequencies of the first electric field and the second electric field. In the case of facing electrodes which are one electrode for a voltage applied and the other electrode for grounding in a regular atmospheric pressure plasma discharge treatment equipment for Samples No. 22 and No. 23 (No filters used), a thin film for Sample No. 22 could not be formed with no discharge generated though an application to electrodes from a higher frequency power source rather than a regular one was made and a good thin film for Sample No. 23 could not be formed though a certain level of discharge appeared when using a lower frequency power source.

EXAMPLE 3

Front Plane

As the base material, a commercially available PMMA plate with 2 mm in thickness on which a hard coat film is formed was used and as an equipment, the same atmospheric pressure plasma discharge treatment equipment as in FIG. 2 was used. The base material was placed on a stage electrode and an anti-reflection film was deposited. Specifically, a stage electrode was reciprocated and a front plane on which an anti-reflection film is deposited with the following laminated structure composed of the base material/a hard coat layer/a high refractive index layer/a low refractive index layer/a high refractive index layer/a low refractive index layer in the order described here (Samples No. 24–27) was manufactured by laminating a high refractive index and a low refractive index layers one after the other on a hard coat film.

[Manufacture of Front Plane on Which Anti-Reflection Film is Deposited]

In the middle of plasma discharging, a temperature adjustment was made in such a way that temperature of a stage electrode and each rectangular cylinder-shaped electrode would become 65° C., and a thin film was formed as described below. As for the first and the second electric fields used for depositing each layer, the same electric fields as in Table 3 were used. Pressure was 103 kPa, a mixture of gases shown below was introduced into a discharge space and inside a plasma discharge vessel respectively, and a front plane on which an anti-reflection film with a 4 layers' lamination is deposited was manufactured (Samples No. 24–27) by forming thin films of a high refractive index layer, a low refractive index layer, a high refractive index layer, and a low refractive index layer in this order on a hard coat film of the base material made of PMMA mentioned above.

<Constituent of Mixed Gas for High Refractive Index Layer>

| The first discharge gas | Nitrogen | 99.4 vol % |
|---|---|---|
| The first gas for thin film formation | Tetraisopropoxytitanium (Vaporization after a mixture with Ar gas by a Lintec Corp. vaporizer) | 0.1 vol % |
| Addition gas | Oxygen gas | 0.5 vol % |

<Condition of High Refractive Index Layer>

| Power density | Stage electrode side | 1 W/cm² |
|---|---|---|
| | Rectangular cylinder-shaped electrode side | 5 W/cm² |

<Constituent of Mixed Gas for Low Refractive Index Layer>

| The first discharge gas | Nitrogen | 98.9 vol % |
|---|---|---|
| The first gas for thin film formation | Tetraethoxysilane (Vaporization after a mixture with Ar gas by a Lintec Corporation vaporizer) | 0.1 vol % |
| Addition gas | Oxygen gas | 1 vol % |

<Condition of High Refractive Index Layer>

| Power density | Stage electrode side | 1 W/cm² |
| | Rectangular cylinder-shaped electrode side | 3 W/cm² |

(Manufacture of Anti-Reflection Film by Vacuum Evaporation)

A continuous vacuum evaporator in which a preheating room, the first evaporation room, and the second evaporation room are independently equipped was used. The aforementioned PMMA base material was placed on a support portion and transported to the preheating room. After the preheating room was heated in a vacuum atmosphere for a predetermined time, the PMMA base material was transported to the first evaporation room which was already in a vacuum state, without any contact with outside air by a conveyance apparatus installed interiorly. And an anti-reflection film was formed inside this first evaporation room as described below.

A front plane on which an anti-reflection film with 4 layers laminated on the PMMA base material heated up to the right temperature for this evaporation in advance is deposited was manufactured (Sample No. 28) by a vacuum evaporation method (degree of vacuum $2 \times 10^{-5}$ Torr). Those 4 layers are composed of a titanium dioxide layer prepared on the PMMA base material by the ion beam assist method of emitting an oxygen ion beam, a silicon dioxide layer prepared by the vacuum evaporation method, a titanium dioxide layer prepared again by the ion beam assist method, and a silicon dioxide layer prepared again by the vacuum evaporation method.

(Manufacture of Anti-Reflection Film by Coating)

As shown below, a high refractive index layer, a low refractive index layer, a high refractive index layer, and a low refractive index layer were coated in this order and a front plane on which an anti-reflection film is formed was manufactured. The manufacturing method for each layer is described below.

<Manufacture of High Refractive Index Layer>

The constituent material H-1 for high refractive index layers shown below was coated on the aforementioned PMMA base material by an extrusion coater and after drying at 70° C. for 7 minutes, the high refractive index layer was cured and prepared by emitting ultra-violet ray (175 mJ/cm²) originated from a high pressure mercury lamp (80 W).

<Constituent Material H-1 for High Refractive Index Layer>

| Isopropanol | 445 weight parts |
| Water | 1.5 weight parts |
| Propyleneglycolmonomethylether | 223 weight parts |
| Methylethylketone | 73 weight parts |
| Tetra (n) butoxytitanium | 545 weight parts |
| γ-methacryloxypropyltrimethoxysilane (KBM503 manufactured by Shin-Etsu Chemical Co., Ltd) | 0.8 weight parts |
| 10% silicone oil (KF-96-1, 000CS, solvent: Methylethylketone manufactured by Shin-Etsu Chemical Co., Ltd) | 1.4 weight parts |

<Manufacture of Low Refractive Index Layer>

The constituent material L-1 for low refractive index layers shown below was coated on the aforementioned high refractive index layer by an extrusion coater and after drying at 60° C. for 7 minutes and then thermally curing at 70° C. for 15 minutes, the low refractive index layer was cured and prepared by emitting ultra-violet ray (175 mJ/cm²).

<Preparation of Tetraethoxysilane Hydrolysis Material A>

Some 580 g of tetraethoxysilane and 1144 g of ethanol were mixed and after a citric acid aqueous solution (1 g of citric acid and 5.4 g of hydrate dissolved in 272 g of water) was added in this mixture, the tetraethoxysilane hydrolysis material was prepared by agitating at room temperature (25° C.) for one hour.

<Constituent Material L-1 for Low Refractive Index Layer>

| Propyleneglycolmonomethylether | 303 weight parts |
| Isopropanol | 305 weight parts |
| Tetraethoxysilane hydrolysis material A | 139 weight parts |
| γ-methacryloxypropyltrimethoxysilane (KBM503 manufactured by Shin-Etsu Chemical Co., Ltd) | 1.6 weight parts |
| 10% FZ-2207, Propyleneglycolmonomethylether solution manufactured by Nippon Unicar Co., Ltd | 1.3 weight parts |

<Manufacture of High Refractive Index Layer>

The constituent material H-1 for high refractive index layers mentioned above was coated on the aforementioned low refractive index layer by an extrusion coater and after drying at 70° C. for 7 minutes, the high refractive index layer was cured and prepared by emitting ultra-violet ray (175 mJ/cm²) originated from a high pressure mercury lamp (80 W).

<Manufacture of Low Refractive Index Layer>

The constituent material L-1 for low refractive index layers mentioned above was coated on the aforementioned high refractive index layer by an extrusion coater and after drying at 60° C. for 7 minutes and then thermally curing at 70° C. for 15 minutes, the low refractive index layer was cured and prepared by emitting ultra-violet ray (175 mJ/cm²).

An anti-reflection front plane with a 4 layers' lamination was manufactured (Sample No. 29).

According to Samples No. 24–29, the same evaluation concerning each state of discharge was made as in Example 1, evaluations described below took place, and results obtained were given in Table 3.

[Evaluation]

(Total Light Transmittance)

In accordance with ASTM D-1003, the total amount of transmission light to the amount of incident light in a visible light was measured.

<Spectral Reflectance>

Reflectance was measured under the condition of regular reflection 5 times by using a spectrophotometer type U-4000 manufactured by Hitachi, Ltd. After a rough-surfacing treatment was done for the surface on the side of a front plane having an anti-reflection film on which the anti-reflection film is not deposited, an optical absorption treatment was done by using a black color spray, reflection spectrums with 400–700 nm in wavelength were measured, and the spectral reflectance within this range of wavelength was determined by preventing the reflection of light on the rear surface of a front plane having an anti-reflection film.

A: less than 2% in the range between 400 and 700 nm
B: 2% and more and less than 5% in the range between 400 and 700 nm
C: 5% and more
D: No thin film deposited sufficiently and unmeasurable (Adhesion of Anti-Reflection Film)

In accordance with JIS K-5400, a number of peel-off grids per 100 grids were measured by a cross-cut tape method.
A: No peel-off
B: a number of peel-off grids between 1 and 90
C: a number of peel-off grids between 91 and 100

(Appearance of Front Plane, Lenticular Lens, or Fresnel Lens Having Anti-Reflection Film)

The optical absorption treatment was done by using a black color spray in order to prevent the reflection of light on the rear surface of a front plane having an anti-reflection film and presence or absence in color unevenness on the front plane having an anti-reflection film was observed visually under the condition of 300 lux (lx) in illumination of outside light.

TABLE 3

| | The first electric field | | | The second electric field | | | Evaluation result | | | | |
|---|---|---|---|---|---|---|---|---|---|---|---|
| Sample No. | Power source type | Frequency ω1 (Hz) | Electric field intensity V1 (kV/mm) | Power source type | Frequency ω2 (Hz) | Electric field intensity V2 (kV/mm) | Total light transmittance % | Reflectance | Adhesion | Appearance | Remark |
| 24 | A3 | 15k | 11 | B1 | 800k | 1.2 | 92.8 | A | A | No color unevenness | Inv. |
| 25 | A5 | 100k | 8 | B3 | 13.56M | 0.8 | 94.3 | A | A | No color I unevenness | Inv. |
| 26 | A2 | 5k | 12 | A2 | 5k | 12 | 88.0 | D | A | No color unevenness | Comp. |
| 27 | B2 | 2M | 1.0 | B2 | 2M | 1.0 | No thin film formed | No thin film formed | No thin film formed | No thin film formed | Comp. |
| 28 | | | Evaporation | | | | 92.1 | A | C | Slight color unevenness appeared | Comp. |
| 29 | | | Coating | | | | 86.9 | D | B | Color unevenness appeared | Comp. |

Inv.: The present invention
Comp.: Comparative example (Result)

A spectral reflectance of a front plane having an anti-reflection film formed with 4 alternate layers composed of a high refractive index layer and a low refractive index layer, (Samples No. 24 and No. 25) which was targeted in advance, was obtained. In addition, the state of discharge was normal in all equipments. On the contrary, a spectral reflectance was inferior to that in the present invention though the condition of discharge was good enough in the case of Sample No. 26 for which an electric field was applied by methods other than in the present invention. In the case of sample No. 27, no discharge was generated and no thin film was also formed. Not only a color unevenness appeared in Sample No. 28 prepared by evaporation, but the adhesion of an anti-reflection film to the base material was poor. A color unevenness was observed in Sample No. 29 prepared by coating.

EXAMPLE 4

Front Plane

[Manufacture of Sample No. 30]

(Atmospheric Pressure Plasma Discharge Treatment Equipment for Antifouling Film Formation)

An antifouling film was formed on an anti-reflection film of Sample No. 25 prepared in the above Example 3 by using an atmospheric pressure plasma discharge treatment equipment for antifouling film formation shown in FIG. 6. Gas type A mentioned below as the second discharge gas was introduced into a space between plane electrodes in which a discharge space is formed and Gas type B mentioned below as the second gas for thin film formation was also introduced into a space between plane electrodes in which no discharge space is formed.

<Gas Type A: The Second Discharge Gas>

| | |
|---|---|
| Ar gas | 98.5 vol % |
| Hidrogen gas | 1.5 vol % |

<Gas Type B: The Second Gas for Thin Film Formation>

| | |
|---|---|
| Ar gas | 99.8 vol % |
| Organometallic compound $(CF_3(CF_2)_7CH_2CH_2Si(OCH_3)_3)$ | 0.2 vol % |
| (Vaporization of an organometallic compound in Ar gas by a vaporizer of Horiba Stec, Co., Ltd) | |

<Electrode>

After stainless steel SUS316 as an electrode was used and alumina ceramic was coated up to 1 mm in thickness on a surface of a plane electrode situated in a discharge space by thermally spraying, coating liquid for which alkoxysilanemonomer is dissolved in an organic solvent was coated on an alumina ceramic film and was dried out. And then a sealing treatment took place at 150° C. in heating in order to form a dielectric. Connecting or grounding through a high frequency power source to the area in a plane electrode where no dielectric is coated took place. A spacing between the base material and a gas emission outlet (below the plane electrode) of the second discharge gas (the second discharge gas activated) and the second gas for thin film formation was designed to be 10 mm.

<High Frequency Power Source>

5 W/cm$^2$ in discharge power density between plane electrodes was applied by using power source manufactured by Pearl Kogyo Co., Ltd. (Frequency: 13.56 MHz) as a power source.

<Formation of Antifouling Film>

The second discharge gas (Gas type A) was activated in the discharge space, the indirect activated gas was prepared by bringing the activated second discharge gas into contact with the second gas for thin film formation (Gas type B) in the area outside the discharge space, and then an antifouling film is prepared onto an anti-reflection film on the base material by exposing the base material to the indirect activated gas in order to have Sample No. 30. At this time, the base material was moved in a direction perpendicular to the emission angle of the second gas for thin film formation. As shown in FIG. 6, a scanning motion from side to side was made for the aforementioned movement. The amount used for Gas type A and that for Gas type B was designed to be 1:1 in volume ratio.

The coating liquid for which $CF_3(CF_2)_7CH_2CH_2Si(OCH_3)_3$ is diluted with isopropyl alcohol was bar coated 15 μm in wet thickness and was dried out in such a way that the mean thickness after drying on an anti-reflection film of Sample No. 25 prepared in the aforementioned Example 3 became 10 nm. And then a heat treatment at 70° C. for 8 hours took place and a comparative Sample 31 was prepared.

[Manufacture of Sample 32]

In manufacture of the aforementioned Sample 30, Sample 32 was prepared in the same way as in Sample 30 except that 6-propylene fluoride was used in place of $CF_3(CF_2)_7CH_2CH_2Si(OCH_3)_3$ which was employed as the source material of Gas type B.

[Manufacture of Sample 33]

In manufacture of the aforementioned Sample 30, methyltriethoxysilane was used in place of $CF_3(CF_2)_7CH_2CH_2Si(OCH_3)_3$ which was employed as the source material of Gas type B. The same items other than this as in the above Sample 30 were taken and the comparative Sample 33 was prepared.

[Manufacture of Sample 34]

In manufacture of the aforementioned Sample 30, a high frequency power source (50 kHz) manufactured by Shinko Electric Co., Ltd. as a high frequency power source was used, voltage through 0.5 W/cm$^2$ in power density in a space between plane electrodes which becomes a discharge space was applied to the first electric field, and a mixed gas was supplied after mixing Gas type A and Gas type B before the exposure to a discharge space by using the atmospheric pressure plasma discharge treatment equipment shown in FIG. 2. The same items other than this as in the above Sample 30 were taken and the comparative Sample 34 was prepared.

[Measurement and Evaluation of Property Values in Each Sample No. 30–34]

(Measurement of Contact Angle)

A contact angle to water on the surface of an antifouling film was measured under circumstances of 23° C. in temperature and 55% in relative humidity by a Kyowa Interface Science Co., Ltd. antenna meter. Measurements were done at 10 places at random and the mean value out of those measurements was obtained.

(Evaluation of Wiping Resistance Property)

A surface (the surface on which an antifouling film is formed) of each of Samples No. 30–No. 34 was rubbed 500 times by a piece of chamois skin which was immersed in water at 25° C. for 5 minutes and was taken out of the water in the air. Some 500 g in load was applied to a piece of chamois skin. A contact angle to water on the surface of each of Samples No. 30–No. 34 was measured by the same measurement method with an antenna meter as mentioned above.

(Evaluation of Fingerprint Adhesion)

As for an evaluation of a staining property on a surface of each of Samples No. 30–No. 34, after each Sample No. 30–34 was placed under circumstances of 25° C. in temperature and 60% in relative humidity for 2 hours, fingerprints were put on the surface of each of Samples No. 30–No. 34 and the state at the time when they were wiped off by a piece of cleaning cloth was observed. Evaluations of fingerprint adhesion of each of Samples No. 30–No. 34 were made on a basis as shown below.

A: Fingerprints totally removed only by slightly wiping
B: Fingerprints totally removed by wiping C: Fingerprints left over slightly D: No fingerprints removed substantially
(Evaluation of Appearance)

Each Sample 30–34 was checked with the naked eye in order for observations on whether or not there are a color unevenness and a color change in interference appeared. (Observations were made on whether or not appearance of each of Samples No. 30–No. 34 which can be sufficiently applied for a front plane is prepared.)

Those results obtained are shown in Table 4.

TABLE 4

| | | | Gas for thin film formation | | Evaluation result | | | | | |
|---|---|---|---|---|---|---|---|---|---|---|
| | Anti- | | | | | Wiping resistance property | Finger-print removal | Finger-print removal | | |
| Sample No. | fouling film formation method | Constituent of discharge gases | source material | Constituent of Gas | Contact angle (°) | (Contact angle (°)) | property the 1$^{st}$ round | property the 20$^{th}$ round | Appearance | Remark |
| 30 | *1 | Ar/H$_2$ | CF$_3$(CH$_2$)$_7$CH$_2$CH$_2$Si(OCH$_3$)$_3$ | Ar | 112 | 105 | A | B | Good | Inv. |
| 31 | Coating method | — | CF$_3$(CH$_2$)$_7$CH$_2$CH$_2$Si(OCH$_3$)$_3$ | — | 104 | 75 | B | D | Total interference irregularity emerged | Comp. |
| 32 | *1 | Ar/H$_2$ | 6-propylene fluoride | Ar | 98 | 65 | D | D | Good | Comp. |
| 33 | *1 | Ar/H$_2$ | methyltriethoxysilane | Ar | 90 | 47 | B | D | Good | Comp. |
| 34 | *2 | Ar/H$_2$ | CF$_3$(CH$_2$)$_7$CH$_2$CH$_2$Si(OCH$_3$)$_3$ | Ar | 93 | 52 | B | D | Good | Comp. |

*1: Atmospheric pressure plasma method (FIG. 6)
*2: Atmospheric pressure plasma method (FIG. 2)
Inv.: The present invention
Comp.: Comparative example As obviously seen in Table 4, it is understood that Sample No. 30 for which an antifouling film was formed by employing an organometallic compound having an organic group with fluorine atoms as the source material for the second gas for thin film formation is superior in water-repelling and fingerprint removal property to comparative Samples No. 31–No. 34. It is also understood that Sample No. 30 kept on maintaining an antifouling function and was excellent in durability, to other samples despite the fact that a process of adhesion and removal of fingerprint was repeated 20 times especially for Sample No. 30.

EXAMPLE 5

Lenticular Lens

[Manufacture of Electrode]

A stage electrode and a rectangular cylinder-shaped electrode were manufactured as follows. Those stage electrode and rectangular cylinder-shaped electrode made of titanium alloy T64 with hollow jackets were manufactured as described below. A high dense and high adhesive alumina thermal spray film was coated on the surfaces facing mutually between a stage electrode and a rectangular cylinder-shaped electrode by the atmospheric pressure plasma method. After coating thereafter the solution which is tetramethoxysilane diluted by ethylacetate and then drying, a curing operation with ultraviolet irradiation and a sealing treatment took place. Coated dielectric surfaces were polished and smoothed and they were processed so that Rmax may come to 5 µm. The percentage of porosity of the final dielectric was 5 vol %. SiO$_x$ content in dielectric layers at this time was 75 mol %. Thickness of the final dielectric and relative permittivity of the dielectric were 1 mm (within ±1% in thickness variation) and 10 respectively. And difference in coefficient of linear thermal expansion between the conductive, metallic base material and the dielectric was 1.6×10$^{-6}$/° C. And also heat-resistant temperature was 250° C.

[Atmospheric Pressure Plasma Discharge Equipment]

By using an atmospheric pressure plasma discharge equipment shown in FIG. 2, a stage electrode which was manufactured in the above explanation and a rectangular cylinder-shaped electrode were arranged to face each other in parallel with some spacing in such a way that a distance between the rectangular cylinder-shaped electrode and the base material becomes 1 mm, and the first electric field and the second electric field, which are shown in Table 5, were placed. Power source A5 was used at 100 kHz in continuous mode (which is the same also in examples described below). In the case of Sample No. 16, a direct current pulsed power source was used for the first electric field and the repetition frequency of ON/OFF was set up to be 10 kHz. Both electrodes were kept warm at 65° C. by adjusting. Each filter to which current does not flow back from the stage electrode and the rectangular cylinder-shaped electrode was installed.

[Manufacture of Titanium Oxide Thin Film]

Electric fields as shown in Table 5 were applied between a stage electrode and a rectangular each cylinder-shaped electrode by using a mixed gas composed of the composition shown below, a thin film was formed by discharging on a commercially available PMMA (polymethyl methacrylate) lenticular lens, and samples 1–16 were prepared. In addition, the electric field intensity at start of discharge was 4.5 kV/mm.

<Composition of Mixed Gas>

| The first discharge gas | Nitrogen | 97.9 vol % |
|---|---|---|
| The first gas for thin film formation | tetraisopropoxytitanium | 0.1 vol % |
| Addition gas | Hydrogen | 2.0 vol % |

[Evaluation]

<State of Discharge>

States of discharge between facing electrodes (between a stage electrode and a rectangular cylinder-shaped electrode) were graded as shown below.

A: Discharge is generated, and it is stable.

B: Discharge is generated, but it is rather unstable

C: No discharge is entirely generated.

<Refractive Index>

Reflection spectrums on those samples 1–16 were measured under the condition of regular reflection 5 times by spectrophotometer Type U-4000 (Hitachi, Ltd). After a surface-roughing treatment was done for the surface on the side of the base material on which a thin film is not formed by an atmospheric pressure plasma discharge treatment equipment, an optical absorption treatment was done by using a black color spray and reflection spectrums with 400–700 nm in wavelength were measured by preventing the reflection of light on the rear surface of the base material. And then, thickness of the film was optically calculated by the value of λ/4 in spectrum and the refractive index based on this calculation was determined. In addition, a low refractive index means a large porosity appeared in layers because of a lack of density in the structure of layers and those phenomena through which air is penetrated into pores at the time of measurements and particles originated in a discharge space are also absorbed in the films result in defective films.

Results were given in Table 5 after states of discharge were observed and reflective indices were also measured.

electrode, in the relation between the first and the second high frequency electric field intensities (V1, V2) and the electric field intensity at start of discharge for the first discharge gas, and in the power density of the second high frequency electric field, dense thin films (which can be determined through the value of refractive index) were prepared under the good discharge condition. On the contrary, for Samples No. 11–No. 16 having nothing to do with the present invention, no dense thin film with porosity (low refractive index) was formed because of inability to form thin films even though discharge is in good condition, or no film was formed entirely because of no generation of discharge.

EXAMPLE 6

Lenticular Lens

All were the same items as in Example 5 except for the changes to the first and the second high frequency electric fields shown in Table 6 and the installation of the first and the second filters shown in Table 6 and Samples No. 17–No. 23 were prepared.

Samples No. 17–No. 23 were evaluated as described above and results were shown in Table 6.

TABLE 5

| | The first electric field | | | | The second electric field | | | | Evaluation result | |
| --- | --- | --- | --- | --- | --- | --- | --- | --- | --- | --- |
| Sample No. | Power source type | Frequency ω1 (Hz) | Electric field intensity V1 (kV/mm) | Power density (W/cm²) | Power source type | Frequency ω2 (Hz) | Electric field intensity V2 (kV/mm) | Power density (W/cm²) | State of discharge | Refractive index | Remark |
| 1 | A2 | 5k | 12 | 1 | B1 | 800k | 1.2 | 10 | A | 2.28 | Inv. |
| 2 | A2 | 5k | 12 | 1 | B2 | 2M | 1.0 | 10 | A | 2.33 | Inv. |
| 3 | A2 | 5k | 12 | 1 | B3 | 13.56M | 0.8 | 10 | A | 2.32 | Inv. |
| 4 | A2 | 5k | 12 | 1 | B4 | 27M | 0.5 | 10 | A | 2.31 | Inv. |
| 5 | A2 | 5k | 12 | 1 | B5 | 150M | 0.2 | 10 | A | 2.25 | Inv. |
| 6 | A5 | 100k | 8 | 1 | B3 | 13.56M | 0.8 | 10 | A | 2.42 | Inv. |
| 7 | A5 | 100k | 8 | 1 | B3 | 13.56M | 0.2 | 1.0 | A | 2.20 | Inv. |
| 8 | A5 | 100k | 8 | 1 | B3 | 13.56M | 0.23 | 1.2 | A | 2.22 | Inv. |
| 9 | A5 | 100k | 8 | 1 | B4 | 27M | 0.8 | 20 | A | 2.40 | Inv. |
| 10 | A5 | 100k | 8 | 1 | B5 | 150M | 0.5 | 50 | A | 2.35 | Inv. |
| 11 | A5 | 100k | 8 | 1 | B3 | 13.56M | 0.15 | 0.8 | B | 1.85 | Comp. |
| 12 | A4 | 50k | 3.7 | 0.5 | A5 | 100k | 3.7 | 0.5 | B | C (Powder appeared) | Comp. |
| 13 | A2 | 5k | 12 | 1 | A5 | 100k | 8.0 | 1.0 | B | C (Powder appeared) | Comp. |
| 14 | A3 | 15k | 3 | 0.1 | B1 | 800k | 2.0 | 0.1 | C | No thin film formed | Comp. |
| 15 | B3 | 13.56M | 0.8 | 0.2 | B3 | 13.56M | 0.8 | 0.2 | C | No thin film formed | Comp. |
| 16 | — | DC pulse | 12 | 1 | B3 | 13.56M | 0.8 | 10 | B | 1.78 | Comp. |

Inv.: The present invention

Comp.: Comparative example (Result)

As for Samples No. 1–No. 10 relating to the present invention in the relation between frequencies (ω1, ω2) in the first and the second high frequency electric fields applied from a stage electrode and each rectangular cylinder-shaped

TABLE 6

| | | The first electric field | | | | | The second electric field | | | | Evaluation result | | |
|---|---|---|---|---|---|---|---|---|---|---|---|---|---|
| Sample No. | Power source type | Frequency ω1 (Hz) | Electric field intensity V1 (kV/mm) | Power density (W/cm²) | The first filter usage | Power source type | Frequency ω2 (Hz) | Electric field intensity V2 (kV/mm) | Power density (W/cm²) | The second filter usage | State of discharge | Refractive index | Remark |
| 17 | A2 | 5k | 12 | 1 | Condenser 1 | B3 | 13.56M | 0.8 | 10 | Coil 1 | A | 2.33 | Inv. |
| 18 | A5 | 100k | 8 | 1 | Condenser 1 | B3 | 13.56M | 0.8 | 10 | Coil 1 | A | 2.32 | Inv. |
| 19 | A2 | 5k | 12 | 1 | Coil 1 | B1 | 800k | 1.2 | 10 | Coil 1 | A | 2.22 | Inv. |
| 20 | A5 | 100k | 8 | 1 | Coil 1 | B1 | 800k | 1.2 | 10 | Coil 1 | A | 2.28 | Inv. |
| 21 | B1 | 800k | 1.2 | 1 | Coil 2 | B1 | 800k | 1.2 | 10 | Coil 2 | C | *1 | Comp. |
| 22 | B3 | 13.56M | 0.8 | 1 | Not in use | | Not in use | | | Not in use | C | *1 | Comp. |
| 23 | A4 | 50k | 10 | 1 | Not in use | | Not in use | | | Not in use | A | 1.63 | Comp. |

Condenser: 100 pF
Coil 1: 1 μH
Coil 2: 10 μH
*1: No thin film formed
Inv.: The present invention
Comp.: Comparative example (Result)

With a normal discharge generated, thin films for Samples No. 17–No. 20 were formed normally by using an atmospheric pressure plasma discharge treatment equipment and installing filters as shown in Table 6. On the contrary, a thin film for Sample No. 21 could not be formed with no discharge generated because a combination of filters installed was not adjusted to frequencies of the first electric field and the second electric field. In the case of facing electrodes which are one electrode for a voltage applied and the other electrode for grounding in a regular atmospheric pressure plasma discharge treatment equipment for Samples No. 22 and No. 23 (No filters used), a thin film for Sample No. 22 could not be formed with no discharge generated though an application to electrodes from a higher frequency power source rather than a regular one was made and a good thin film for Sample No. 23 could not be formed though a certain level of discharge appeared when using a lower frequency power source.

EXAMPLE 7

Lenticular Lens

As the base material, a commercially available PMMA lenticular lens was used and as the equipment, the same atmospheric pressure plasma discharge treatment equipment as in FIG. 2 was used. The base material was placed on a stage electrode and an anti-reflection film was deposited. Specifically, a stage electrode was reciprocated and a lenticular lens on which an anti-reflection film is deposited with the following laminated structure composed of the base material/a high refractive index layer/a low refractive index layer/a high refractive index layer/a low refractive index layer in the order described here (Samples No. 24–27) was manufactured by laminating a high refractive index and a low refractive index layers one after the other on the base material.

[Manufacture of Lenticular Lens on Which Anti-Reflection Film is Deposited]

In the middle of plasma discharging, a temperature adjustment was made in such a way that temperature of a stage electrode and each rectangular cylinder-shaped electrode would become 65° C., and a thin film was formed as described below. As for the first and the second electric fields used for depositing each layer, the same electric fields as in Table 7 were used. Pressure was 103 kPa, a mixture of gases shown below was introduced into a discharge space and inside a plasma discharge vessel respectively, and a lenticular lens on which an anti-reflection film with a 4 layers' lamination is deposited was manufactured (Samples No. 24–27) by forming thin films of a high refractive index layer, a low refractive index layer, a high refractive index layer, and a low refractive index layer in this order on a lenticular lens made of PMMA mentioned above.

<Constituent of Mixed Gas for High Refractive Index Layer>

| The first discharge gas | Nitrogen | 99.4 vol % |
|---|---|---|
| The first gas for thin film formation | Tetraisopropoxytitanium (Vaporization after a mixture with Ar gas by a Lintec Corp. vaporizer) | 0.1 vol % |
| Addition gas | Oxygen gas | 0.5 vol % |

<Condition of High Refractive Index Layer>

| Power density | Stage electrode side | 1 W/cm² |
|---|---|---|
| | Rectangular cylinder-shaped electrode side | 5 W/cm² |

<Constituent of Mixed Gas for Low Refractive Index Layer>

| | | |
|---|---|---|
| The first discharge gas | Nitrogen | 98.9 vol % |
| The first gas for thin film formation | Tetraethoxysilane (Vaporization after a mixture with Ar gas by a Lintec Corporation vaporizer) | 0.1 vol % |
| Addition gas | Oxygen gas | 1 vol % |

<Condition of High Refractive Index Layer>

| | | |
|---|---|---|
| Power density | Stage electrode side | 1 W/cm$^2$ |
| | Rectangular cylinder-shaped electrode side | 3 W/cm$^2$ |

(Manufacture of Anti-Reflection Film by Vacuum Evaporation)

A continuous vacuum evaporator in which a preheating room, the first evaporation room, and the second evaporation room are independently equipped was used. The aforementioned PMMA lenticular lens was placed on a support portion and transported to the preheating room. After the preheating room was heated in a vacuum atmosphere for a predetermined time, the PMMA base material was transported to the first evaporation room which was already in a vacuum state, without any contact with outside air by a conveyance apparatus installed interiorly. And an anti-reflection film was formed inside this first evaporation room as described below.

A lenticular lens on which an anti-reflection film with 4 layers laminated on the PMMA lenticular lens heated up to the right temperature for this evaporation in advance is deposited was manufactured (Sample No. 28) by a vacuum evaporation method (degree of vacuum 2×10$^{-5}$ Torr). Those 4 layers are composed of a titanium dioxide layer prepared on the PMMA lenticular lens by the ion beam assist method of emitting an oxygen ion beam, a silicon dioxide layer prepared by the vacuum evaporation method, a titanium dioxide layer prepared again by the ion beam assist method, and a silicon dioxide layer prepared again by the vacuum evaporation method.

(Manufacture of Anti-Reflection Film by Coating)

As shown below, a coating agent was coated on a lenticular lens and a lenticular lens on which an anti-reflection film is formed was manufactured. The thin film was prepared by dipping a lenticular lens in a transparent fluorine resin solution with a low refractive index "CYTOP manufactured by Asahi Glass Co., Ltd" and drawing it upward at a uniform speed. A lenticular lens with an anti-reflection film was manufactured (Sample No. 29 in Table 7) by this coating method.

According to Samples No. 24–No. 29, the same evaluation concerning each state of discharge was made as in Example 5, evaluations described below took place, and results obtained were given in Table 7.

[Evaluation]

(Total Light Transmittance)

In accordance with ASTM D-1003, the total amount of transmission light to the amount of incident light in a visible light was measured.

(Appearance of Lenticular Lens Having Anti-Reflection Film)

The optical absorption treatment was done by using a black color spray in order to prevent the reflection of light on the rear surface of a front plane having an anti-reflection film and presence or absence in color unevenness on the front plane having an anti-reflection film was observed visually under the condition of 300 lux (lx) in illuminance of outside light.

TABLE 7

| | The first electric field | | | The second electric field | | | Evaluation result | | |
|---|---|---|---|---|---|---|---|---|---|
| Sample No. | Power source type | Frequency ω1 (Hz) | Electric field intensity V1 (kV/mm) | Power source type | Frequency ω2 (Hz) | Electric field intensity V2 (kV/mm) | Total light trans-mittance | Appearance | Remark |
| 24 | A3 | 15k | 11 | B1 | 800k | 1.2 | 90.4 | No color unevenness | Inv. |
| 25 | A5 | 100k | 8 | B3 | 13.56M | 0.8 | 91.5 | No color I unevenness | Inv. |
| 26 | A2 | 5k | 12 | A2 | 5k | 12 | 88.0 | No color unevenness | Comp. |
| 27 | B2 | 2M | 1.0 | B2 | 2M | 1.0 | No thin film formed | No thin film formed | Comp. |
| 28 | | | | Evaporation | | | 88.3 | color unevenness appeared | Comp. |
| 29 | | | | Coating | | | Nonuniformity in coating appeared | Nonuniformity in coating appeared | Comp. |

Inv.: The present invention
Comp.: Comparative example (Result)

A high total light transmittance was obtained for a lenticular lens with an anti-reflection film formed with a method of the present invention by laminating 4 refractive index layers (Samples No. 24 and No. 25). In addition, the state of discharge was normal in all equipment. On the contrary, a total light transmittance was inferior to that in the present invention though the condition of discharge was good enough in the case of Sample No. 26 for which an electric field was applied by methods other than that in the present invention. In the case of sample No. 27, neither discharge was generated, nor thin film was also formed. In the case of a lenticular lens with an anti-reflection film deposited by evaporation (Sample No. 28), the total light transmittance was inferior to that in the present invention. A color-unevenness was also observed through an appearance evaluation. In the case of a lenticular lens with an anti-reflection film prepared by coating (Sample No. 29), an anti-reflection film was not coated evenly.

EXAMPLE 8

Fresnel Lens

[Manufacture of Electrode]

A stage electrode and a rectangular cylinder-shaped electrode were manufactured as follows. Those stage electrode and rectangular cylinder-shaped electrode made of titanium alloy T64 with hollow jackets were manufactured as described below. A high dense and high adhesive alumina thermal spray film was coated on the surfaces facing mutually between a stage electrode and a rectangular cylinder-shaped electrode by the atmospheric pressure plasma method. After coating thereafter the solution which is tetramethoxysilane diluted by ethylacetate and then drying, a curing operation with ultraviolet irradiation and a sealing treatment took place. Coated dielectric surfaces were polished and smoothed and they were processed so that Rmax may come to 5 μm. The percentage of porosity of the final dielectric was 5 vol %. $SiO_x$ content in dielectric layers at this time was 75 mol %. Thickness of the final dielectric and relative permittivity of the dielectric were 1 mm (within ±1% in thickness variation) and 10 respectively. And difference in coefficient of linear thermal expansion between the conductive, metallic base material and the dielectric was $1.6 \times 10^{-6}/°$ C. And also heat-resistant temperature was 250° C.

[Atmospheric Pressure Plasma Discharge Equipment]

By using an atmospheric pressure plasma discharge equipment shown in FIG. 2, a stage electrode which was manufactured in the above explanation and a rectangular cylinder-shaped electrode were arranged to face each other in parallel with some spacing in such a way that a distance between the rectangular cylinder-shaped electrode and the base material becomes 1 mm, and the first electric field and the second electric field, which are shown in Table 8, were placed. Power source A5 was used at 100 kHz in continuous mode (which is the same also in examples described below) In the case of Sample No. 16, a direct current pulsed power source was used for the first electric field and the repetition frequency of ON/OFF was set up to be 10 kHz. Both electrodes were kept warm at 65° C. by adjusting. Each filter to which current does not flow back from the stage electrode and the rectangular cylinder-shaped electrode was installed.

[Manufacture of Titanium Oxide Thin Film]

Electric fields as shown in Table 8 were applied between a stage electrode and a rectangular each cylinder-shaped electrode by using a mixed gas composed of the composition shown below, a thin film was formed by discharging on a commercially available PMMA (polymethyl methacrylate) fresnel lens, and samples 1–16 were prepared. In addition, the electric field intensity at start of discharge was 4.5 kV/mm.

<Composition of Mixed Gas>

| | | |
|---|---|---|
| The first discharge gas | Nitrogen | 97.9 vol % |
| The first gas for thin film formation | tetraisopropoxytitanium | 0.1 vol % |
| Addition gas | Hydrogen | 2.0 vol % |

[Evaluation]

<State of Discharge>

States of discharge between facing electrodes (between a stage electrode and a rectangular cylinder-shaped electrode) were graded as shown below.

A: Discharge is generated, and it is stable.
B: Discharge is generated, but it is rather unstable
C: No discharge is entirely generated.

<Refractive Index>

Reflection spectrums on those samples 1–16 were measured under the condition of regular reflection 5 times by spectrophotometer Type U-4000 (Hitachi, Ltd). After a surface-roughing treatment was done for the surface on the side of the base material on which a thin film is not formed by an atmospheric pressure plasma discharge treatment equipment, an optical absorption treatment was done by using a black color spray and reflection spectrums with 400–700 nm in wavelength were measured by preventing the reflection of light on the rear surface of the base material. And then, thickness of the film was optically calculated by the value of λ/4 in spectrum and the refractive index based on this calculation was determined. In addition, a low refractive index means a large porosity appeared in layers because of a lack of density in the structure of layers and those phenomena through which air is penetrated into pores at the time of measurements and particle originated in a discharge space are also absorbed in the films result in defective films.

Results were given in Table 8 after states of discharge were observed and refractive indices were also measured.

TABLE 8

| | The first electric field | | | | The second electric field | | | | Evaluation result | | |
|---|---|---|---|---|---|---|---|---|---|---|---|
| Sample No. | Power source type | Frequency ω1 (Hz) | Electric field intensity V1 (kV/mm) | Power density (W/cm²) | Power source type | Frequency ω2 (Hz) | Electric field intensity V2 (kV/mm) | Power density (W/cm²) | State of discharge | Refractive index | Remark |
| 1 | A2 | 5k | 12 | 1 | B1 | 800k | 1.2 | 10 | A | 2.28 | Inv. |
| 2 | A2 | 5k | 12 | 1 | B2 | 2M | 1.0 | 10 | A | 2.33 | Inv. |

TABLE 8-continued

| | The first electric field | | | | The second electric field | | | Evaluation result | | |
|---|---|---|---|---|---|---|---|---|---|---|
| Sample No. | Power source type | Frequency ω1 (Hz) | Electric field intensity V1 (kV/mm) | Power density (W/cm$^2$) | Power source type | Frequency ω2 (Hz) | Electric field intensity V2 (kV/mm) | Power density (W/cm$^2$) | State of discharge | Refractive index | Remark |
| 3 | A2 | 5k | 12 | 1 | B3 | 13.56M | 0.8 | 10 | A | 2.32 | Inv. |
| 4 | A2 | 5k | 12 | 1 | B4 | 27M | 0.5 | 10 | A | 2.31 | Inv. |
| 5 | A2 | 5k | 12 | 1 | B5 | 150M | 0.2 | 10 | A | 2.25 | Inv. |
| 6 | A5 | 100k | 8 | 1 | B3 | 13.56M | 0.8 | 10 | A | 2.42 | Inv. |
| 7 | A5 | 100k | 8 | 1 | B3 | 13.56M | 0.2 | 1.0 | A | 2.20 | Inv. |
| 8 | A5 | 100k | 8 | 1 | B3 | 13.56M | 0.23 | 1.2 | A | 2.22 | Inv. |
| 9 | A5 | 100k | 8 | 1 | B4 | 27M | 0.8 | 20 | A | 2.40 | Inv. |
| 10 | A5 | 100k | 8 | 1 | B5 | 150M | 0.5 | 50 | A | 2.35 | Inv. |
| 11 | A5 | 100k | 8 | 1 | B3 | 13.56M | 0.15 | 0.8 | B | 1.85 | Comp. |
| 12 | A4 | 50k | 3.7 | 0.5 | A5 | 100k | 3.7 | 0.5 | B | C (Powder appeared) | Comp. |
| 13 | A2 | 5k | 12 | 1 | A5 | 100k | 8.0 | 1.0 | B | C (Powder appeared) | Comp. |
| 14 | A3 | 15k | 3 | 0.1 | B1 | 800k | 2.0 | 0.1 | C | No thin film formed | Comp. |
| 15 | B3 | 13.56M | 0.8 | 0.2 | B3 | 13.56M | 0.8 | 0.2 | C | No thin film formed | Comp. |
| 16 | — | DC pulse | 12 | 1 | B3 | 13.56M | 0.8 | 10 | B | 1.78 | Comp. |

Inv.: The present invention
Comp.: Comparative example (Result)

As for Samples No. 1–No. 10 relating to the present invention in the relation between frequencies (ω1, ω2) in the first and the second high frequency electric fields applied from a stage-electrode and each rectangular cylinder-shaped electrode, in the relation between the first and the second high frequency electric field intensities (V1, V2) and the electric field intensity at start of discharge for the first discharge gas, and in the power density of the second high frequency electric field, dense thin films (which can be determined through the value of refractive index) were prepared under the good discharge condition. On the contrary, for Samples No. 11–No. 16 having nothing to do with the present invention, no dense thin film with porosity (low refractive-index) was formed because of inability to form thin films even though discharge is in good condition, or no film was formed entirely because of no generation of discharge.

EXAMPLE 9

Fresnel Lens

All were the same items as in Example 8 except for the changes to the first and the second high frequency electric fields shown in Table 9 and the installation of the first and the second filters shown in Table 9 and Samples No. 17–No. 23 were prepared.

Samples No. 17–No. 23 were evaluated as described above and results were shown in Table 9.

TABLE 9

| | The first electric field | | | | | The second electric field | | | | | Evaluation result | | |
|---|---|---|---|---|---|---|---|---|---|---|---|---|---|
| Sample No. | Power source type | Frequency ω1 (Hz) | Electric field intensity V1 (kV/mm) | Power density (W/cm$^2$) | The first filter usage | Power source type | Frequency ω2 (Hz) | Electric field intensity V2 (kV/mm) | Power density (W/cm$^2$) | The second filter usage | State of discharge | Refractive index | Remark |
| 17 | A2 | 5k | 12 | 1 | Condenser 1 | B3 | 13.56M | 0.8 | 10 | Coil 1 | A | 2.33 | Inv. |
| 18 | A5 | 100k | 8 | 1 | Condenser 1 | B3 | 13.56M | 0.8 | 10 | Coil 1 | A | 2.32 | Inv. |
| 19 | A2 | 5k | 12 | 1 | Coil 1 | B1 | 800k | 1.2 | 10 | Coil 1 | A | 2.22 | Inv. |
| 20 | A5 | 100k | 8 | 1 | Coil 1 | B1 | 800k | 1.2 | 10 | Coil 1 | A | 2.28 | Inv. |
| 21 | B1 | 800k | 1.2 | 1 | Coil 2 | B1 | 800k | 1.2 | 10 | Coil 2 | C | *1 | Comp. |
| 22 | B3 | 13.56M | 0.8 | 1 | Not in use | | Not in use | | | Not in use | C | *1 | Comp. |

TABLE 9-continued

| | | The first electric field | | | | The second electric field | | | | Evaluation result | | |
|---|---|---|---|---|---|---|---|---|---|---|---|---|
| Sample No. | Power source type | Frequency ω1 (Hz) | Electric field intensity V1 (kV/mm) | Power density (W/cm$^2$) | The first filter usage | Power source type | Frequency ω2 (Hz) | Electric field intensity V2 (kV/mm) | Power density (W/cm$^2$) | The second filter usage | State of discharge | Refractive index | Remark |
| 23 | A4 | 50k | 10 | 1 | Not in use | Not in use | | | | Not in use | A | 1.63 | Comp. |

Condenser: 100 pF
Coil 1: 1 μH
Coil 2: 10 μH
*1: No thin film formed
Inv.: The present invention
Comp.: Comparative example (Result)

With a normal discharge generated, thin films for Samples No. 17–No. 20 were formed normally by using an atmospheric pressure plasma discharge treatment equipment and installing filters as shown in Table 9. On the contrary, a thin film for Sample No. 21 could not be formed with no discharge generated because a combination of filters installed was not adjusted to frequencies of the first electric field and the second electric field. In the case of facing electrodes which are one electrode for a voltage applied and the other electrode for grounding in a regular atmospheric pressure plasma discharge treatment equipment for Samples No. 22 and No. 23 (No filters used), a thin film for Sample No. 22 could not be formed with no discharge generated though an application to electrodes from a higher frequency power source rather than a regular one was made and a good thin film for Sample No. 23 could not be formed though a certain level of discharge appeared when using a lower frequency power source.

EXAMPLE 10

Fresnel Lens

Figure 9:
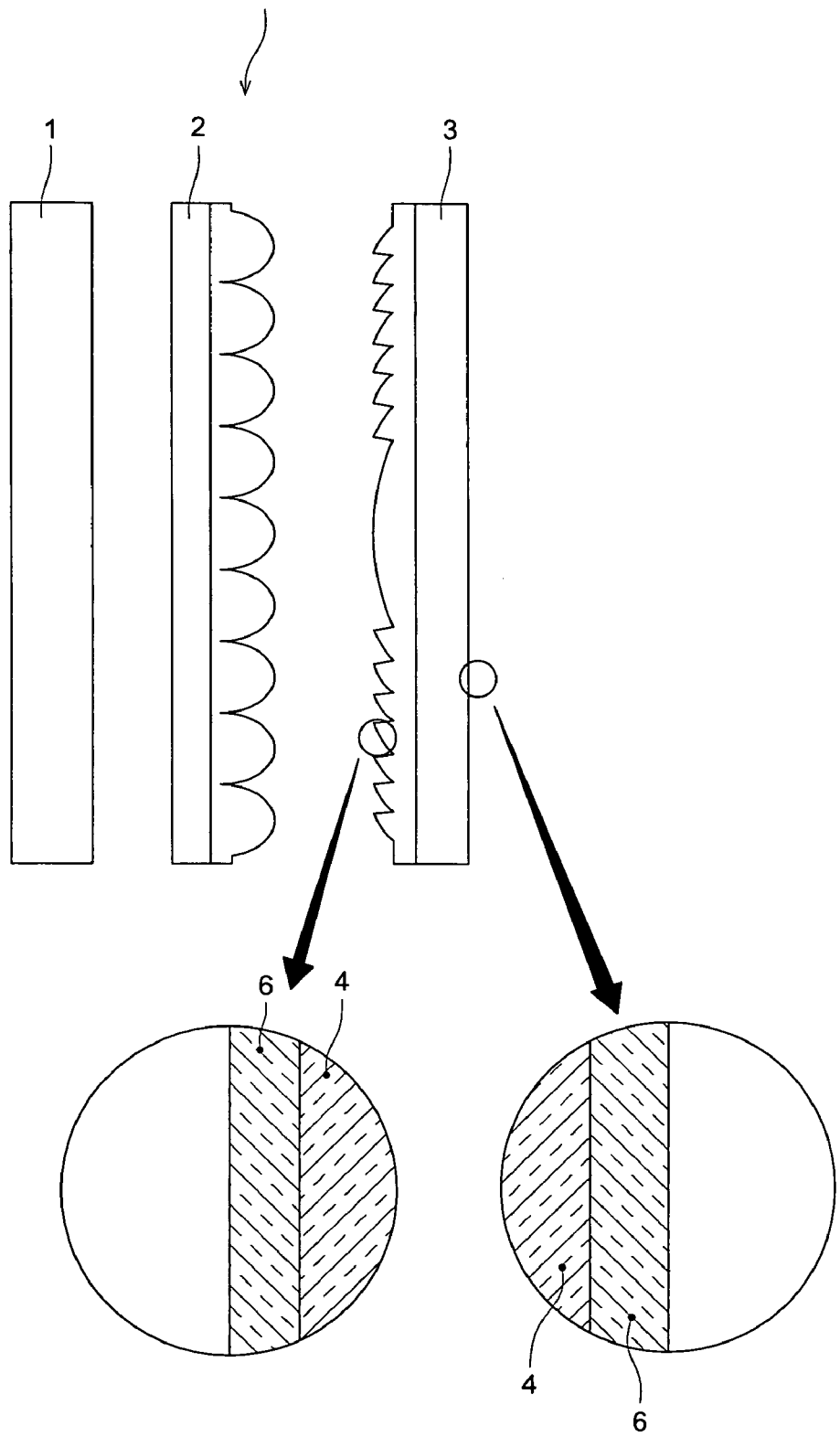

As the base material, a commercially available PMMA fresnel lens was used and as the equipment, the same atmospheric pressure plasma discharge treatment equipment as in FIG. 2 was used. The shape of fresnel lens was the same one as shown in FIG. 9 and its height was 0.1–70 μm. A rising angle of the fresnel lens was 5° to the optical axis of the lens. The base material was placed on a stage electrode and an anti-reflection film was deposited. Specifically, a stage electrode was reciprocated and a fresnel lens on which an anti-reflection film is deposited with the following laminated structure composed of the base material/a high refractive index layer/a low refractive index layer/a high refractive index layer/a low refractive index layer in the order described here (Samples No. 24–27) was manufactured by laminating a high refractive index and a low refractive index layers one after the other on the base material.

[Manufacture of Fresnel Lens on Which Anti-Reflection Film is Deposited]

In the middle of plasma discharging, a temperature adjustment was made in such a way that temperature of a stage electrode and each rectangular cylinder-shaped electrode would become 65° C., and a thin film was formed as described below. As for the first and the second electric fields used for depositing each layer, the same electric fields as in Table 10 were used. Pressure was 103 kPa, a mixture of gases shown below was introduced into a discharge space and inside a plasma discharge vessel respectively, and a fresnel lens on which an anti-reflection film with a 4 layers' lamination is deposited was manufactured (Samples No. 24–27) by forming thin films of a high refractive index layer, a low refractive index layer, a high refractive index layer, and a low refractive index layer in this order on the base material made of PMMA mentioned above.

<Constituent of Mixed Gas for High Refractive Index Layer>

| | | |
|---|---|---|
| The first discharge gas | Nitrogen | 99.4 vol % |
| The first gas for thin film formation | Tetraisopropoxytitanium (Vaporization after a mixture with Ar gas by a Lintec Corp. vaporizer) | 0.1 vol % |
| Addition gas | Oxygen gas | 0.5 vol % |

<Condition of High Refractive Index Layer>

| | | |
|---|---|---|
| Power density | Stage electrode side | 1 W/cm$^2$ |
| | Rectangular cylinder-shaped electrode side | 5 W/cm$^2$ |

<Constituent of Mixed Gas for Low Refractive Index Layer>

| | | |
|---|---|---|
| The first discharge gas | Nitrogen | 98.9 vol % |
| The first gas for thin film formation | Tetraethoxysilane (Vaporization after a mixture with Ar gas by a Lintec Corporation vaporizer) | 0.1 vol % |
| Addition gas | Oxygen gas | 1 vol % |

<Condition of High Refractive Index Layer>

| Power density | Stage electrode side | 1 W/cm² |
| --- | --- | --- |
| | Rectangular cylinder-shaped electrode side | 3 W/cm² |

(Manufacture of Anti-Reflection Film by Vacuum Evaporation)

A continuous vacuum evaporator in which a preheating room, the first evaporation room, and the second evaporation room are independently equipped was used. The aforementioned PMMA fresnel lens was placed on a support portion and transported to the preheating room. After the preheating room was heated in a vacuum atmosphere for a predetermined time, the PMMA base material was transported to the first evaporation room which was already in a vacuum state, without any contact with outside air by a conveyance apparatus installed interiorly. And an anti-reflection film was formed inside this first evaporation room as described below.

A fresnel lens on which an anti-reflection film with 4 layers laminated on the PMMA fresnel lens heated up to the right temperature for this evaporation in advance is deposited was manufactured (Sample No. 28) by a vacuum evaporation method (degree of vacuum $2\times10^{-5}$ Torr). Those 4 layers are composed of a titanium dioxide layer prepared on the PMMA fresnel lens by the ion beam assist method of emitting an oxygen ion beam, a silicon dioxide layer prepared by the vacuum evaporation method, a titanium dioxide layer prepared again by the ion beam assist method, and a silicon dioxide layer prepared again by the vacuum evaporation method.

(Manufacture of Anti-Reflection Film by Coating)

Coating was conducted on the aforementioned PMMA flesnel lens by a coating liquid prepared as shown below and a fresnel lens on which an anti-reflection film is formed was manufactured. Specifically, 0.04 μm of silica particle in mean particle diameter was used for particles for anti-reflection treatment, 6 μm of titanium oxide in mean particle diameter was used for particles for diffusion layer formation, and a coating liquid was obtained by mixing acryl resin as a binder and ethyl acetate as a solvent. Viscosity of the coating liquid was 1 poise. The coating was made on a fresnel surface of the emitting side and the whole area of rising surfaces with this coating liquid by the spin-coating method (Rotational speed: 1500 rotations/min.). After this, a fresnel lens sheet was cleansed after it was dipped in sodium hydroxide aqueous solution at 65° C. Then, the fresnel lens with an anti-reflection film was manufactured (Sample No. 29 in Table 10) by this coating method.

According to Samples No. 24–No. 29, evaluations described below took place, and results obtained were given in Table 10.

[Evaluation]

(Total Light Transmittance)

In accordance with ASTM D-1003, the total amount of transmission light to the amount of incident light in a visible light was measured.

(Appearance of Fresnel Lens Having Anti-Reflection Film)

The optical absorption treatment was done by using a black color spray in order to prevent the reflection of light on the rear surface of a front plane having an anti-reflection film and presence or absence in color unevenness on the front plane having an anti-reflection film was observed visually under the condition of 300 lux (lx) in illuminance of outside light.

TABLE 10

| | The first electric field | | | The second electric field | | | Evaluation result | | |
| --- | --- | --- | --- | --- | --- | --- | --- | --- | --- |
| Sample No. | Power source type | Frequency ω1 (Hz) | Electric field intensity V1 (kV/mm) | Power source type | Frequency ω2 (Hz) | Electric field intensity V2 (kV/mm) | Total light transmittance | Appearance | Remark |
| 24 | A3 | 15k | 11 | B1 | 800k | 1.2 | 93.0 | No color unevenness | Inv. |
| 25 | A5 | 100k | 8 | B3 | 13.56M | 0.8 | 93.8 | No color I unevenness | Inv. |
| 26 | A2 | 5k | 12 | A2 | 5k | 12 | 88.8 | No color unevenness | Comp. |
| 27 | B2 | 2M | 1.0 | B2 | 2M | 1.0 | No thin film formed | No thin film formed | Comp. |
| 28 | | | Evaporation | | | | 89.1 | color unevenness appeared | Comp. |
| 29 | | | Coating | | | | Nonuniformity in coating appeared | Nonuniformity in coating appeared | Comp. |

Inv.: The present invention
Comp.: Comparative example (Result)

A high total light transmittance was obtained for a fresnel lens with an anti-reflection film formed with a method of the present invention by laminating 4 refractive index layers (Samples No. 24 and No. 25). In addition, the state of discharge was normal in all equipment. On the contrary, a total light transmittance was inferior to that in the present invention though the condition of discharge was good enough in the case of Sample No. 26 for which an electric field was applied by methods other than that in the present invention. In the case of sample No. 27, neither discharge was generated, nor thin film was also formed. In the case of a fresnel lens with an anti-reflection film deposited by evaporation (Sample No. 28), the total light transmittance was inferior to that in the present invention. A color unevenness was also observed through an appearance evaluation. In the case of a fresnel lens with an anti-reflection film prepared by coating (Sample No. 29), an anti-reflection film was not coated evenly.

[Effect of the Invention]

According to the invention described in Structure 1–Structure 14, a display front plane with an anti-reflection film in thickness uniformity and a good adhesion between the anti-reflection film and the base material can be provided without problems such as non-uniformity in thickness because of non-uniformity in the coated anti-reflection film which appeared and an inferior adhesion between the anti-reflection film and the base material, because the anti-reflection film is prepared on the base material by exposing it to an activated gas under the special condition of discharge, unlike in the case of the anti-reflection film prepared on the base material by a coating technique or an evaporation technique.

According to the invention described in Structure 15 and Structure 16, a display front plane having an antifouling function like water-repelling can be provided since an antifouling film is prepared onto an anti-reflection film on the base material.

According to the invention described in structure 1–structure 14, a display lenticular lens and a display fresnel lens wherein a sophisticated anti-reflection function with a high total light transmittance is added can be provided without problems such as non-uniformity in thickness because of non-uniformity in the coated anti-reflection film which appeared, because the anti-reflection film is prepared on the base material by exposing it to an activated gas under the special condition of discharge, unlike in the case of the anti-reflection film prepared on the base material by a coating technique.

What is claimed is:

1. A display front plane on which an anti-reflection film is formed on at least one side of the surface of said base material by supplying gas containing the first gas for thin film formation into a discharge space under the atmospheric pressure or the pressure close to it, then, by activating the gas by applying a high frequency electric field to the discharge space, and by exposing the base material to the activated gas, wherein
    said high frequency electric field is the field where first and second high frequency electric fields are superposed,
    frequency of the second high frequency electric field $\omega 2$ is higher than that of the first high frequency electric field $\omega 1$,
    the relation among intensity of the first high frequency electric field V1, intensity of the second high frequency electric field V2, and electric field intensity at start of discharge IV satisfies $V1 \geqq IV > V2$ or $V1 > IV \geqq V2$, and
    the power density of the second high frequency electric field is 1 W/cm$^2$ or more.

2. The display front plane according to claim 1, wherein said discharge space is composed of the first electrode and the second electrode facing each other.

3. The display front plane according to claim 2, wherein said first and second high frequency electric fields are applied to the first and second electrodes respectively.

4. The display front plane according to claim 1, wherein the power density of said second high frequency electric field is not more than 50 W/cm$^2$.

5. The display front plane according to claim 4, wherein the power density of said second high frequency electric field is not more than 20 W/cm$^2$.

6. The display front plane according to claim 1, wherein the power density of said first high frequency electric field is 1 W/cm$^2$ or more.

7. The display front plane according to claim 6, wherein the power density of said first high frequency electric field is not more than 50 W/cm$^2$.

8. The display front plane according to claim 1, wherein both of said first high frequency electric field and said second high frequency electric field are composed of sine waves.

9. The display front plane according to claim 1, wherein an amount of 90–99.9 vol % of the total gas introduced into said discharge space is the first discharge gas.

10. The display front plane according to claim 9, wherein said first discharge gas contains 50–100 vol % of nitrogen gas.

11. The display front plane according to claim 9, wherein said first discharge gas contains inert gas whose volume is less than 50 vol %.

12. The display front plane according to claim 1, wherein said first gas for thin film formation contains at least one selected from an organometallic compound, a halogenated metal, and a metallic hydrogen compound.

13. The display front plane according to claim 12, wherein said organometallic compound contains at least one selected from an organosilicon compound, an organotitanium compound, an organotin compound, an organozinc compound, an organoindium compound, and an organoaluminum compound.

14. The display front plane according to claim 1, wherein a thickness of said base material is 1 mm or more.

15. The display front plane according to claim 1,
    wherein an antifouling film containing an organometallic compound having an organic group with fluorine atoms is formed on said anti-reflection film.

16. The display front plane according to claim 1, wherein under the atmospheric pressure or the pressure close to it, the second discharge gas is introduced into the discharge space to be activated, then, the activated second discharge gas is brought into contact with the second gas for thin film formation containing an organometallic compound having an organic group with fluorine atoms outside the discharge space to generate indirect activated gas, thus an antifouling film is prepared onto said anti-reflection film on said base material by exposing the base material to the indirect activated gas.

* * * * *